US010445355B2

(12) United States Patent
Miller et al.

(10) Patent No.: US 10,445,355 B2
(45) Date of Patent: *Oct. 15, 2019

(54) SYSTEMS AND METHODS FOR PROVIDING A VISUALIZABLE RESULTS LIST

(71) Applicant: LexisNexis, a division of Reed Elsevier Inc., Miamisburg, OH (US)

(72) Inventors: Richard D. Miller, Yellow Springs, OH (US); Jacob Aaron Myers, Dayton, OH (US); Todd J. Frascone, Donnelsville, OH (US); Gaurav Mehra, Mason, OH (US); Ronald C. Haines, Springboro, OH (US); Philip Wittmer, Dayton, OH (US); Yangguang Li, Bloomington, IN (US)

(73) Assignee: RELX INC., New York, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 15/266,573

(22) Filed: Sep. 15, 2016

(65) Prior Publication Data

US 2017/0293685 A1 Oct. 12, 2017

Related U.S. Application Data

(63) Continuation-in-part of application No. 15/092,999, filed on Apr. 7, 2016.

(51) Int. Cl.
| *G06F 16/248* | (2019.01) |
| *G06F 16/34* | (2019.01) |
| *G06F 16/335* | (2019.01) |
| *G06F 16/35* | (2019.01) |
| *G06F 16/93* | (2019.01) |
| *G06F 16/31* | (2019.01) |
| *G06F 17/24* | (2006.01) |

(52) U.S. Cl.
CPC .......... *G06F 16/335* (2019.01); *G06F 16/248* (2019.01); *G06F 16/325* (2019.01); *G06F 16/345* (2019.01); *G06F 16/35* (2019.01); *G06F 16/93* (2019.01); *G06F 17/241* (2013.01)

(58) Field of Classification Search
CPC .................. G06F 17/30696; G06F 16/248
See application file for complete search history.

(56) References Cited

U.S. PATENT DOCUMENTS

| 8,682,907 B1 | 3/2014 | Yang et al. |
| 9,009,146 B1 | 4/2015 | Lopatenko et al. |

(Continued)

OTHER PUBLICATIONS

International Search Report and Written Opinion dated Jul. 19, 2017 in related PCT application No. PCT/US2017/024527, 18pp.

*Primary Examiner* — Charles E Lu

(74) *Attorney, Agent, or Firm* — Dinsmore & Shohl LLP

(57) ABSTRACT

Systems and methods for displaying a visualizable results list in response to an electronic search request are disclosed. A method includes accessing metadata for each of a plurality of search results that result from a search query, annotating one or more locations in each search result with first and second indicators for each of one or more grouped search terms in first and second units based on the metadata, and displaying a visualizable results list that includes the plurality of search results and a corresponding hit pattern for each search result. The hit pattern includes the first indicator and the second indicator.

20 Claims, 17 Drawing Sheets

(56) References Cited

U.S. PATENT DOCUMENTS

| | | |
|---|---|---|
| 2008/0071738 A1 | 3/2008 | Hoeber et al. |
| 2010/0070484 A1 | 3/2010 | Kraft et al. |
| 2012/0095999 A1 | 4/2012 | Donde et al. |
| 2012/0204104 A1* | 8/2012 | Walsh ............... G06F 17/30705 715/273 |
| 2013/0054589 A1 | 2/2013 | Cheslow |
| 2013/0304720 A1* | 11/2013 | Malkin ............. G06F 17/30554 707/706 |
| 2014/0365886 A1* | 12/2014 | Koenig ............... G06F 3/04855 715/711 |
| 2015/0026169 A1 | 1/2015 | Brown et al. |
| 2015/0310005 A1 | 10/2015 | Ryger et al. |

\* cited by examiner

Term scores Generator

| search | daccount | ranityPercent | commonalityPercent |
|---|---|---|---|
| 'toy-gun' | 2389 | 100 | 0.0 |
| 'bank robbery' | 24265 | 100 | 0.2 |
| 'weapon' | 328285 | 98 | 2.5 |
| 'felony' | 375228 | 96 | 4.4 |
| 'intent' | 1765925 | 86 | 15.6 |
| 'threat' | 847562 | 93 | 6.5 |
| 'toy gun' AND 'bank robbery' | 243 | 100 | 0.0 |
| 'toy gun' AND 'weapon' | 1259 | 100 | 0.0 |
| 'toy gun AND 'felony' | 789 | 100 | 0.0 |
| 'toy gun' AND 'intent' | 829 | 100 | 0.0 |
| 'toy gun AND 'threat' | 1059 | 100 | 0.0 |
| 'bank robbery' AND 'weapon' | 6578 | 100 | 0.0 |
| 'bank robbery' AND 'felony' | 6559 | 100 | 0.0 |
| 'bank robbery' AND 'intent' | 7229 | 100 | 0.1 |
| 'bank robbery' AND 'threat' | 6719 | 100 | 0.1 |
| 'weapon' AND 'felony' | 122556 | 99 | 0.9 |
| 'weapon' AND 'intent' | 157469 | 99 | 1.1 |
| 'weapon' AND 'threat' | 126505 | 99 | 1.0 |
| 'felony' AND 'intent' | 222528 | 98 | 1.7 |
| 'felony' AND 'threat' | 145092 | 99 | 1.1 |
| 'intent AND 'threat' | 320464 | 98 | 2.5 |

FIG. 7

1. Robertson v. National Basketball Asso., 389 F. Supp. 867 ~920

Overview: An athletic association's sole control over televised football games violated the Sherman Act because it was a monopoly that had horizontal restraints in trade, it decreased the amount of football games aired, and raised the prices paid to air them.

Terms: Opinion

... has a significant potential for anticompetitive effects. 28 In this connection, it is not without significance that Congress felt the need to grant professional sports an exemption from the antitrust laws for joint marketing of television rights. See 15 U. S. C. §§ 1291-1295. The legislative history of this ...

SYSTEMS AND METHODS FOR PROVIDING A VISUALIZABLE RESULTS LIST

CROSS-REFERENCE TO RELATED APPLICATION

The present application is a continuation-in-part of U.S. patent application Ser. No. 15/092,999. filed Apr. 20, 2016 and entitled "SYSTEMS AND METHODS FOR PROVIDING A VISUALIZABLE RESULTS LIST," which is incorporated by reference herein in its entirety.

BACKGROUND

Field

The present specification generally relates to providing search results and, more particularly, to systems and methods that provide search results with visuals to assist a user in determining which results closely match the user's desired needs.

Technical Background

Currently, researchers, upon conducting a search in a particular database, are presented with search results that may be ranked according to certain criteria, such as a date, number of hits, a determined relevance, a type of result, and/or the like. However, the determined ranking of results may not correspond to the researcher's desired ranking methodology. In addition, the results may not provide the researcher with a visualizable means of reordering the ranking according to the researcher's desired ranking methodology. Even more, the results do not provide the user with sufficient pertinent information from each hit in the results list such that the user can determine whether the hit is relevant.

Accordingly, a need exists for systems and methods that provide search results with a high malleability and a visualizable means of reordering and re-ranking the results that correspond to a particular researcher's desired ranking methodology and provide the user with sufficient pertinent information from each hit in the results list such that the user can decide whether a hit is relevant to his or her search.

SUMMARY

In one embodiment, a method of displaying a visualizable results list in response to an electronic search request includes accessing, by a processing device, metadata for each of a plurality of search results that result from a search query, annotating, by the processing device, one or more locations in each search result with a first indicator for each of one or more grouped search terms in the search query and a second indicator for each of one or more grouped search terms in a second unit in the search query based on the metadata, and displaying, by the processing device, a visualizable results list including the plurality of search results and a corresponding hit pattern for each search result. The hit pattern includes the first indicator and the second indicator.

In another embodiment, a method of displaying a visualizable results list in response to a search request includes receiving, by a processing device, a search query including a plurality of search terms, grouping, by the processing device, the plurality of search terms into a plurality of units, where each of the plurality of units includes a related one or more of the plurality of search terms, accessing, by the processing device, metadata for each document in a plurality of search results that corresponds to the search query, annotating, by the processing device, one or more locations in each document with a first indicator for each of the one or more search terms in a first unit of the plurality of units and a second indicator for each of the one or more search terms in a second unit of the plurality of units based on the metadata, and displaying, by the processing device, a visualizable results list. The visualizable results list includes the plurality of search results and a corresponding hit pattern for each document in the plurality of search results. The hit pattern includes one or more sections of the document, a first one or more hashes corresponding to each first indicator, and a second one or more hashes corresponding to each second indicator. The first one or more hashes and the second one or more hashes positioned within the hit pattern in one or more locations that correspond to the one or more locations of the search terms in the document.

In another embodiment, a system for displaying a visualizable results list includes a processing device and a non-transitory, processor-readable storage medium in communication with the processing device. The non-transitory, processor-readable storage medium includes one or more programming instructions that, when executed, cause the processing device to receive a search query that includes a plurality of search terms and group the plurality of search terms into a plurality of units. Each of the plurality of units includes a related one or more of the plurality of search terms. The non-transitory, processor-readable storage medium further includes one or more programming instructions that, when executed, cause the processing device to access metadata for each document in a plurality of search results that corresponds to the search query, annotate one or more locations in each document with a first indicator for each of the one or more search terms in a first unit of the plurality of units and a second indicator for each of the one or more search terms in a second unit of the plurality of units based on the metadata, and display a visualizable results list. The visualizable results list includes the plurality of search results and a corresponding hit pattern for each document in the plurality of search results. The hit pattern includes one or more sections of the document, a first one or more hashes corresponding to each first indicator, and a second one or more hashes corresponding to each second indicator. The first one or more hashes and the second one or more hashes positioned within the hit pattern in one or more locations that correspond to the one or more locations of the search terms in the document.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 7 depicts an illustrative table of unit scores according to one or more embodiments shown and described herein;

FIG. 10 depicts a detailed screen shot of illustrative search results according to one or more embodiments shown and described herein;

FIG. 12 depicts a screen shot of an alternative illustrative user interface displaying search results annotated with units according to one or more embodiments shown and described herein;

FIG. 15 depicts a detailed screen shot of illustrative search results in the alternative user interface of FIG. 12 according to one or more embodiments shown and described herein;

DETAILED DESCRIPTION

Figure 1:
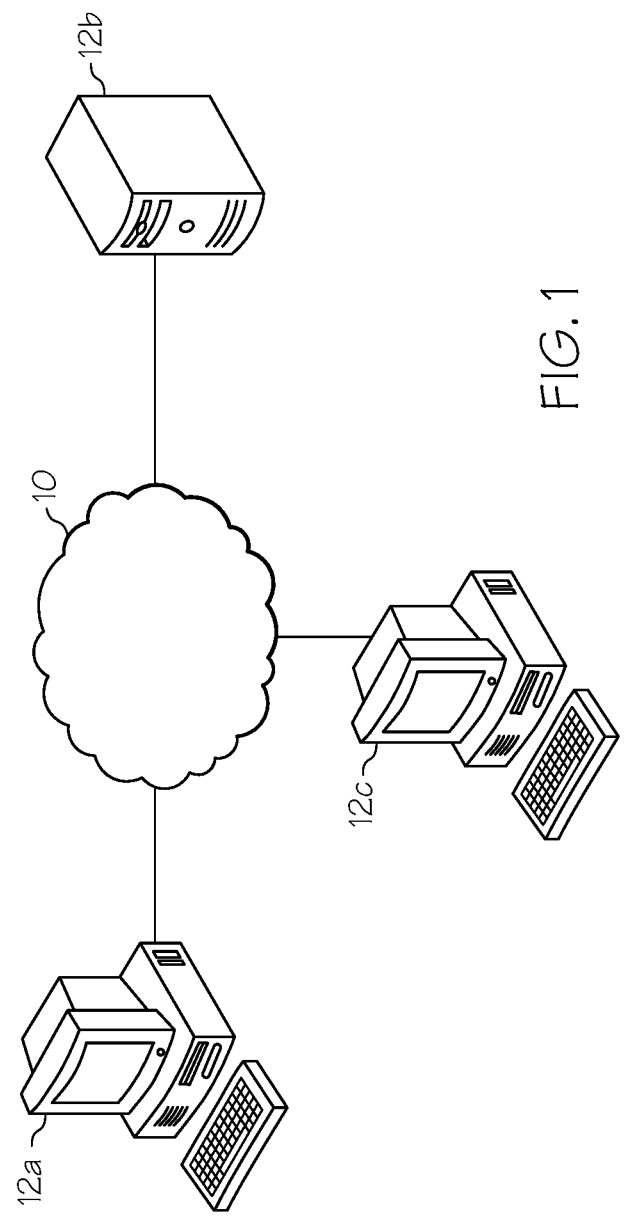
FIG. 1 is a schematic depiction of an illustrative computing network for a system for providing a visualizable results list according to one or more embodiments shown and described herein.

Referring generally to the figures, embodiments described herein are directed to systems and methods for providing a visualizable list of search results to a user that are based on the user's search query. Particularly, the systems and methods described herein provide a collection of documents returned from a query along with visual representations that depict "hit patterns" at an aggregated list level and/or at a document level. The systems and methods described herein further provide one or more interactive features that enable the user to alternatively rank the results list based on one or more document attributes. In addition, the systems and methods described herein provide pertinent information from each document that is retrieved by the user as a result of the search such that the user is able to more easily determine whether the document is germane to the information the user seeks to obtain.

As will be described in greater detail herein, a researcher using the systems and methods described herein may enter a search phrase (either Boolean or non-Boolean) and receive a list of results that correspond to the search phrase, which may be the result of the use of one or more tokens from the search phrase. For each result in the list of results, the systems and methods described herein may provide a link to the document and a hit pattern that provides additional information regarding the location of search terms within the document, the location of particular groupings of search terms within the document, document sections, and/or the like. In addition, in response to one or more inputs, the systems and methods described herein may provide excerpts of the document to the researcher, where the excerpts relate to the hit pattern. Such excerpts may be provided without the need for the user to access each document individually. As such, the researcher can quickly determine whether the document is germane to his/her search without having to spend excessive time reading through the remainder of the document.

As will be apparent from the present disclosure, the systems and methods described herein may be particularly configured to increase a researcher's productivity when conducting a search by providing a malleable user interface that is particularly configured to accurately provide pertinent information the researcher needs to make an informed decision regarding search results and to determine whether particular documents discovered within the results are relevant. That is, the results are displayed in a manner that is intuitive to the user and provides the user with an ability to alter the display as necessary to obtain the needed information, unlike previous means of displaying results, which merely allowed for re-sorting and/or filtering of a results list based on particular preset conditions. In addition, the systems and methods described herein improve the functioning of a computing device by customizing the way the computing device provides search results for a particular user without requiring additional computing power. As such, the computing device becomes particularly customized for each of a plurality of users, all at the same time, without requiring additional computing power to do so.

While the systems and methods described herein may refer to specific examples relating to legal research, including case law, statute, and/or legal treatise research, it should be understood that such examples are merely illustrative and the present disclosure is not limited to such instances. Rather, the systems and methods described herein may be implemented in any field of research, regardless of whether such fields are particularly described herein. For example, the systems and methods may be implemented within the realm of academic research, scientific research, general Internet-based research, and/or the like.

As used herein, the term "researcher" refers generally to any user that uses the systems and methods described herein to conduct research. As such, the terms "researcher" and "user" may be used interchangeably herein. Examples of researchers may include, but are not limited to, legal researchers, academic researchers, scientific researchers, general researchers, and/or the like.

As used herein, a "document" generally refers to a collection of text within a search result. The document may correspond to an electronic document or a physical document, but may be displayed to a user as text within a user interface (such as a web browser screen or the like). As such, a document is generally a single search result within a collection of search results, as such terms are used herein. An illustrative document may contain, for example, the text of a court opinion as reported by a particular reporter.

Referring now to the drawings, FIG. 1 depicts an illustrative computing network that depicts components for a system for providing a search interface and a visualizable results list according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more computing devices and/or components thereof. Illustrative computing devices may include, but are not limited to, a user computing device 12a, a server computing device 12b, and an administrator computing device 12c.

The user computing device 12a may generally be used as an interface between the user (e.g., the researcher) and the other components connected to the computer network 10. Thus, the user computing device 12a may be used to perform one or more user-facing functions, such as receiving one or more inputs from a user or providing information to the user, as described in greater detail herein. Accordingly, the user computing device 12a may include at least a display and/or input hardware, as described in greater detail herein. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c may also be used to input additional data into the corpus stored on the server computing device 12b.

The server computing device 12b may receive data from one or more sources, store data, index data, search data, and/or provide data to the user computing device 12a in the form of search results, visual representations such as hit patterns, documents, excerpts from one or more documents, and/or the like.

It should be understood that while the user computing device 12a and the administrator computing device 12c are depicted as personal computers and the server computing device 12b is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, components, and/or the like.

Figure 2:
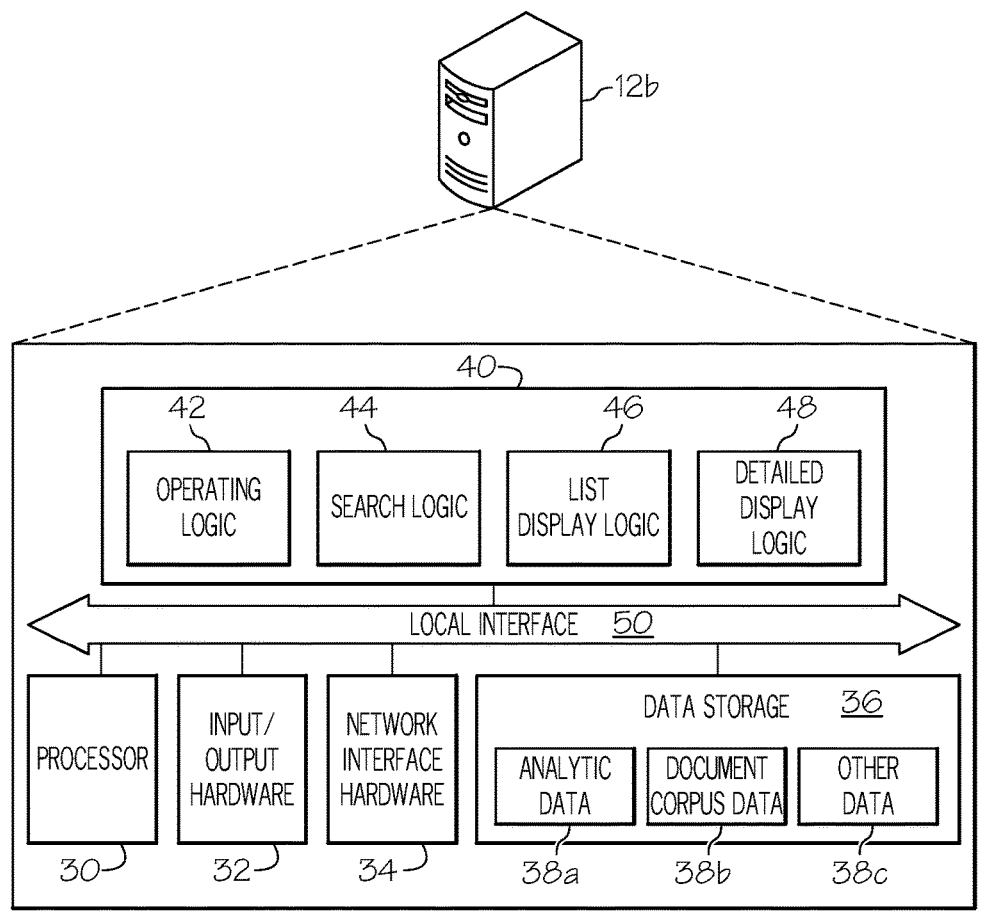
FIG. 2 is a schematic depiction of the server computing device from FIG. 1, further illustrating hardware and software that may be used in providing a visualizable results list according to one or more embodiments shown and described herein.

FIG. 2 depicts the server computing device 12b, from FIG. 1, further illustrating a system for receiving data from one or more sources, storing data, indexing data, searching data, and/or providing data. In addition, the server computing device 12b may include a non-transitory computer-readable medium for searching and providing data embodied as hardware, software, and/or firmware, according to embodiments shown and described herein. While in some embodiments the server computing device 12b may be configured as a general purpose computer with the requisite hardware, software, and/or firmware, in some embodiments, the server computing device 12b may also be configured as a special purpose computer designed specifically for performing the functionality described herein.

As also illustrated in FIG. 2, the server computing device 12b may include a processor 30, input/output hardware 32, network interface hardware 34, a data storage component 36 (which may store analytic data 38a, document corpus data 38b, and other data 38c), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store various processing logic, such as operating logic 42, search logic 44, list display logic 46, and/or detailed display logic 48 (each of which may be embodied as a computer program, firmware, or hardware, as an example). A local interface 50 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data and selectively provide access to the one or more pieces of data. As illustrated in FIG. 2, the data storage component 36 may store analytic data 38a, document corpus data 38b, and/or other data 38c, as described in greater detail herein.

Included in the memory component 40 are the operating logic 42, the search logic 44, the list display logic 46, and/or the detailed display logic 48. The operating logic 42 may include an operating system and/or other software for managing components of the server computing device 12b. The search logic 44 may be configured to generate search queries from a user input within the graphical user interface. The list display logic 46 may generate and display a list of search hits or documents uncovered from the search logic 44, as well as visual representations for user manipulation, as described in detail below. The detailed display logic 48 may be configured to generate and display additional details regarding a particular element of the list generated and displayed by the list display logic 46, including a document, a hit pattern, and/or a hit list within a document, as described in detail below.

It should be understood that the components illustrated in FIG. 2 are merely illustrative and are not intended to limit the scope of this disclosure. More specifically, while the components in FIG. 2 are illustrated as residing within the server computing device 12b, this is a nonlimiting example.

In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
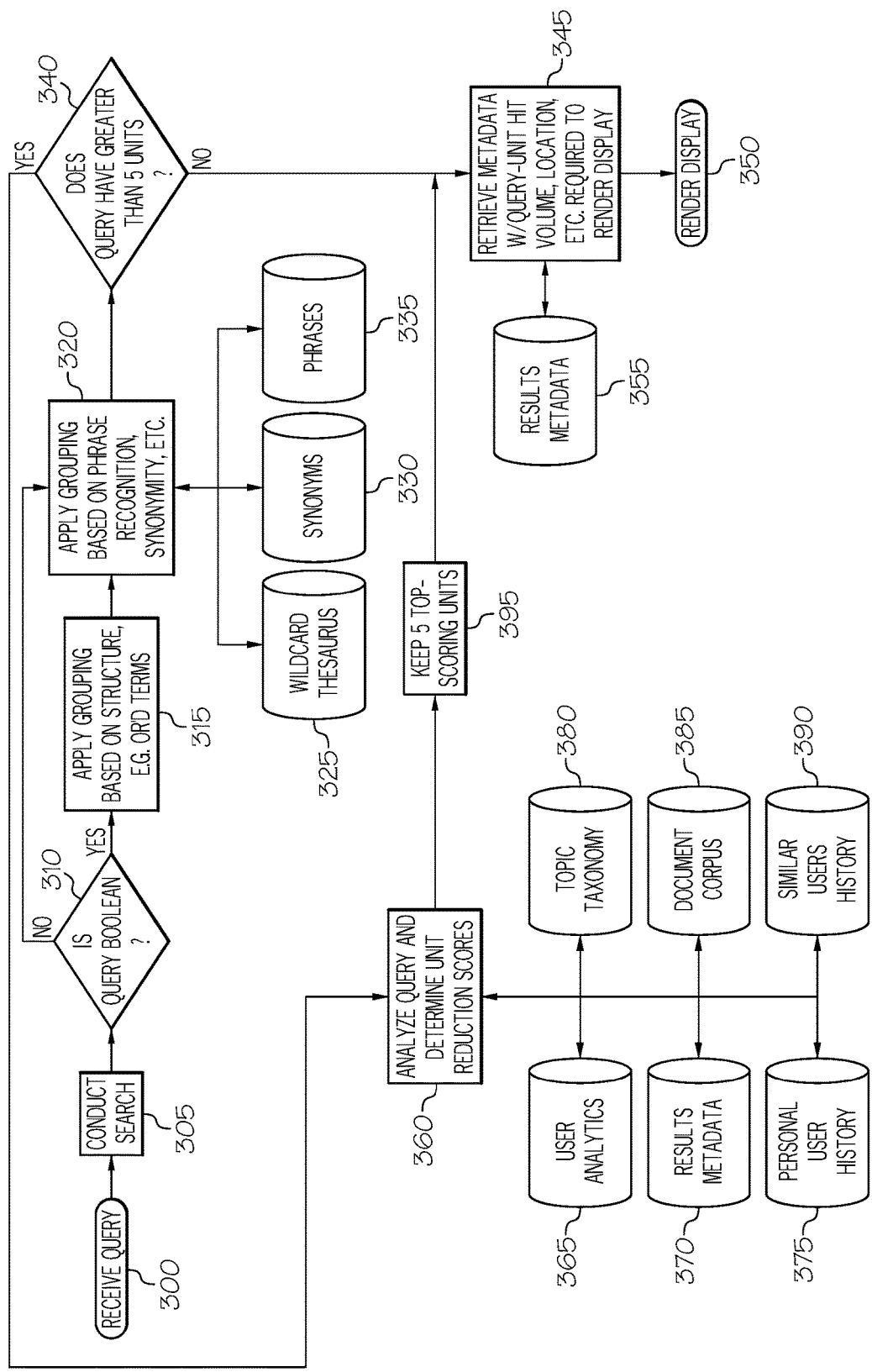
FIG. 3 depicts a block diagram of an illustrative overview of generating and rendering a visualizable results display according to one or more embodiments shown and described herein.

FIG. 3 depicts a block diagram of an illustrative method of providing a visualizable results list. At step 300, a query is received. The query is generally one or more search terms (e.g., words) inputted by a user. More particularly, the user may desire to discover one or more search results (e.g., documents or the like) that pertain to a particular subject, a particular set of circumstances, and/or the like. As such, the user inputs the query as a set of one or more search terms that the user believes will result in the search and retrieval of the search results desired by the user. The query may be in any query format now known or later developed, such as, for example, a natural language query, a Boolean query, or the like. A natural language query is a request for data that is set forth in a natural language, such as English, Spanish, French, German, or the like. As such, a user may enter a natural language query by inputting any combination of words or phrases. In some embodiments, a user may input a natural language query in the form of a question, i.e., the user may desire to retrieve search results that would answer the question that is inputted. A Boolean query is a request for data that is set forth as one or more terms separated by specific syntax that indicates the relationship between the terms. Illustrative syntax may include the words "AND" and "OR".

Figure 4:
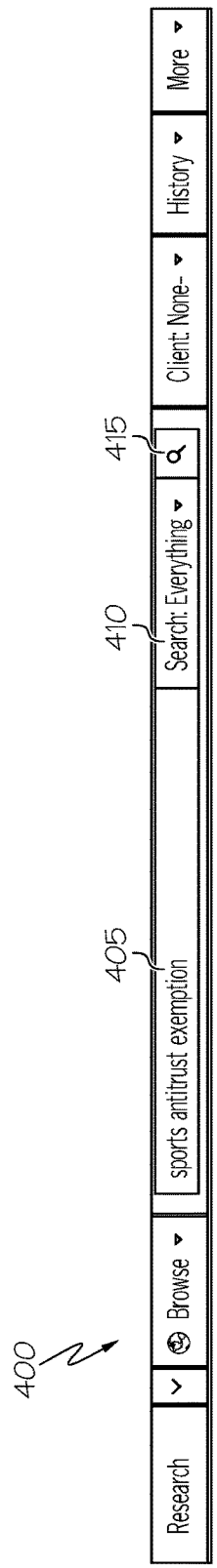
FIG. 4 depicts a screen shot of an illustrative user interface for searching according to one or more embodiments shown and described herein.

To receive the query, a system (or component thereof, such as a computing device) may provide a search field in a user interface, where the query can be inputted into the search field by a user via a user interface device. For example, as shown in FIG. 4, the user computing device may provide the search field as a user-modifiable text box 405 within a user interface 400 that is displayed to the user on a display device or the like. A user can enter text into the text box 405 via one or more user input devices, such as the input/output hardware 32 (FIG. 2) described herein. A nonlimiting example of a query entered into the text box 405 may be the terms "sports", "antitrust", and "exemption". Such a query may indicate, for example, that the user desires to retrieve search results regarding antitrust exemptions that are related to sports.

In some embodiments, the computing device may also provide additional user-selectable menu items 410 via the user interface 400 in addition to the user-modifiable text box 405 to further tailor the user's search query. Such user-selectable menu items 410 may, for example, allow the user to specify a particular location to search for the query terms, such as in all available resources, only within particular databases and/or document categories, within particular sections of documents, and/or the like. As particularly shown in FIG. 4, the user-selectable menu items 410 may be presented as a drop-down box that lists the various options for a user to select. Once the user has entered the text into the text box 405 and selected the user-selectable menu items 410, the user may trigger the search query to be submitted. Such a trigger may be, for example, when a user strikes the "enter" button on a keyboard, selects a search button 415 presented via the user interface 400, and/or the like.

It should be understood that the user interface 400 presented in FIG. 4 is merely an illustrative example of one possible means of receiving a query. As such, other means of receiving a query are contemplated and possible without departing from the scope of the present disclosure. For example, a query may be input via a speech input and/or the like.

Referring again to FIG. 3, the system may execute a search based on the query, as shown at step 305. Executing the search may be completed at any time after the search query is received, and may occur concurrently with one or more of the other processes described herein with respect to FIG. 3. Execution of the search may be completed via any searching method now known or later developed, and is not limited by this disclosure.

At step 310, the system may determine whether the received query is a Boolean query. Such a determination may be completed by analyzing the query and determining whether the query contains the specific syntax that is generally recognized as Boolean syntax. As previously described herein, such syntax includes, but is not limited to, words such as "AND" and "OR". In some embodiments, the query may only be recognized as Boolean if the specific syntax is in a particular format (e.g., all caps, certain connectors, Boolean syntax, or the like).

If the determination indicates that the query is Boolean, the various words of the query may be grouped based on the structure of the query. More specifically, words or phrases that are separated by an "OR" term may be recognized as being alternative search terms that can be grouped together as a single element for the purposes of displaying search results. That is, if a user inputs the following Boolean phrase "basketball OR football", the system may search for documents containing either word (as is typical for Boolean queries); however, for the purposes of displaying the results, the system may group the words "basketball" and "football" together as if they were the same term for the purpose of providing visualizable search results, the same unit associated with a particular meaning, and/or interchangeable terms, as described in greater detail herein.

If the determination is that the query is not Boolean, the system may skip step 315 and proceed directly to step 320. In addition, once step 315 is completed for Boolean queries, the system may proceed to step 320. At step 320, the search terms (e.g., words and phrases) are grouped based on a recognition that certain terms are synonymous or interchangeable for the purposes of displaying the results. That is, similar to that as described with respect to step 315, the groupings are only completed for the purposes of displaying the results, and do not affect the searching. As such, the search is carried out in a typical fashion (i.e., the search is conducted by any means of searching now known or later developed).

Figure 5:
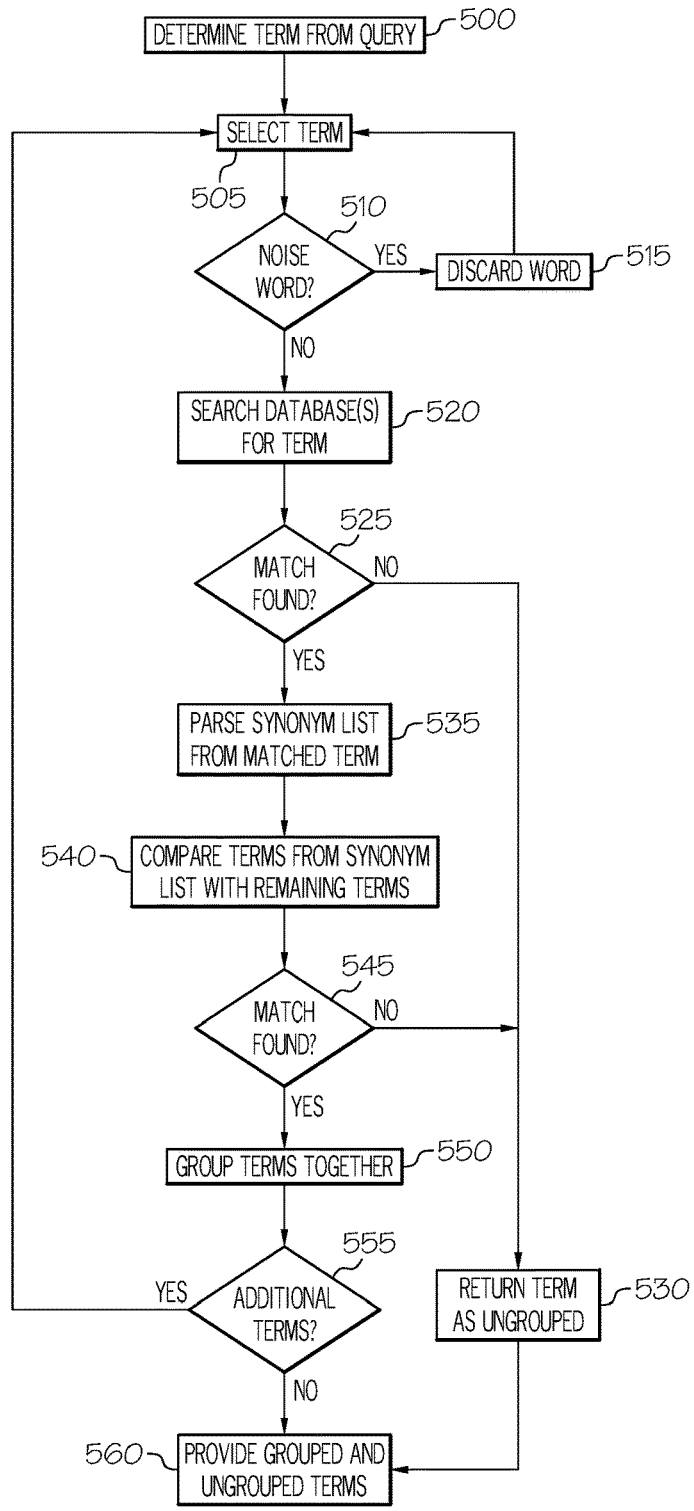
FIG. 5 depicts a flow diagram of an illustrative method of grouping terms into units according to one or more embodiments shown and described herein.

The terms of the query may be grouped at step 320 by accessing one or more databases to determine groupings. Such databases include, but are not limited to, a wildcard thesaurus database 325, a synonym database 330, and a phrases database 335. A wildcard thesaurus database 325 is a database that contains certain wildcard terms that are recognized as being synonyms for the purposes of grouping search results as described herein. For example, if a query includes the term "sport", a wildcard thesaurus database 325 may include terms that have a wildcard relation to the terms "sport*", "sport!", "!sport", "*sport", or the like, including, but not limited to, "sports", "sporting", "sportsmanship", "sporty", "sportscast", "sportswear", "multisport", "transport", "passport", and the like. A synonym database 330 is a database that contains recognized synonyms of words, including words that may not be exact synonyms, but convey a similar meaning as the term. For example, a synonym database 330 may include, for the term "sport", exact synonyms such as "athletics", "game", "recreation", "pastime", or the like, as well as other words that convey a similar meaning, such as "football", "basketball", "tennis", "hockey", "baseball", and the like. A phrases database 335 is a database that contains recognized phrases, even when such phrases are not bound by common phrase indicators (such as, for example, quotation marks). For example, certain phrases in the phrase database may allow for recognition that when the words "basketball" and "game" appear consecutively in a query, they are treated as the phrase "basketball game" even though the words are not entered with phrase indicators. In some embodiments, the phrases database 335 may be specific to a particular field in which the query is being searched. For example, if the searching is related to legal databases (e.g., a search engine that searches case law, statutes, legal treatises, and/or the like), the phrases database 335 may be specific to particular legal terms, such as "fee simple", "beyond a reasonable doubt", or the like. Such terms may or may not be recognized as phrases outside the legal context. Additional detail regarding grouping of the query terms for the purposes of displaying the results is shown in FIG. 5.

At step 500, a term may be determined from the query. The term may be a word, a phrase, and/or the like. If the query is a Boolean query, each term may be separated by one of the syntax terms/words. Thus, for example, if the Boolean query is "antitrust exemptions AND sports OR basketball OR football", a determination may be that the terms include the phrase "antitrust exemptions" and each of the words "sports", "basketball", and "football". If the query is a natural language query, each word of the query may initially be deemed a term, unless certain punctuation is present in the query. Thus, if the natural language query is "what "antitrust exemptions" exist in sports, particularly football and basketball?", each word in the query would be considered a term except for "antitrust exemptions" because it is bounded between quotation marks.

At step 505, a determined term is selected for the purposes of grouping. For example, if the determination of the terms from the query is "antitrust exemptions" and "sports", then either "antitrust exemptions" or "sports" may be selected. As will be described in greater detail herein, all terms in the query will eventually be selected for the purposes of grouping, so selecting a term at step 505 is not limited to a particular selection methodology. For example, a term may be selected because it appears first in the query or because it is the next term in the query (when the previous term has already been selected).

At step 510, a determination may be made as to whether the term is a noise word or a noise phrase. Noise words/phrases are generally words/phrases that are non-key words/phrases that, if searched, would likely not narrow the search results because of their commonality. As such, noise words and noise phrases are terms and phrases that are generally unhelpful in identifying the subject matter of a document. Nonlimiting examples of noise words include "a", "the", "an", "of", "to", "on", and the like. If the term is a noise word or noise phrase, it may be discarded at step 515 and the process may return to step 505. Noise words and noise phrases are generally discarded because a user likely will not be interested in noise words/phrases when visualizing the search results, as described in greater detail herein.

If the term is not a noise word or noise phrase, the process may proceed to step 520. At step 520, one or more databases may be searched for the term. As previously described above, the databases may generally be databases that are specific to determining a grouping of like terms for the purposes of displaying the search results. That is, the databases are particular databases that are used to determine query grouping, including wildcard thesaurus databases, synonym databases, and phrase databases.

At step 525, a determination is made as to whether a match for the term is found in one or more of the databases. If no match is found, the term is returned as an ungrouped term at step 530. That is, the term is not grouped together with other terms for the purposes of displaying the search results as described herein. Rather, the term alone may be indicated as being different from other units, as described in greater detail herein.

If a match is found, the list of synonyms for the term is parsed at step 535 and compared with the remaining terms at step 540 to determine whether a match exists. For example, if the query includes the terms "sports", "basketball", and "football" and a match for the term "sports" is found in the database, the synonyms for the term "sports" in that database may be parsed to determine whether any of the synonyms match the terms "basketball" and "football". If, based on a determination at step 545 that matches are not found, the term is returned as ungrouped at step 530.

If, based on the determination at step 545 that matches are found between the remaining terms in the query and the synonym list, the terms are grouped together at step 550. That is, when the search results are displayed, the grouped terms will appear together as similarly colored indicators or the like, as described herein. However, the terms will still be applied separately for the purposes of conducting the search, as described herein. In a nonlimiting example, if the terms "football" and "basketball" both appear in the synonym list for the term "sports", all three terms will be grouped together such that the search results only display the grouping of those three terms with a single colored indicator rather than each of the three terms individually as separately colored indicators.

At step 555, a determination may be made as to whether additional terms remain in the query that either have not been grouped together or returned as ungrouped. If additional terms remain, the process may return to step 505. If no additional terms remain, the list(s) of grouped and ungrouped terms may be provided at step 560. Providing the list(s) may generally include storing the lists in memory for future access, as will be described in greater detail herein.

Referring again to FIG. 3, once the terms have been grouped or determined to be ungrouped, a determination may be made at step 340 as to whether the query contains a number of units that is above or below a particular threshold. A unit refers to a group of terms or a single term if the term is ungrouped. Such a determination may be desirable because an excessive amount of units (e.g., an amount above the threshold number) may result in a results list that appears to be cluttered (i.e., too many differently colored indicators) and may be difficult for a user to find certain results that are germane to the user's search goals. While step 340 refers to a threshold of 5 units, such a number is merely illustrative and the present disclosure is not limited to such. That is, the threshold may be any number of units without departing from the scope of the present disclosure. An illustrative threshold may be, for example, 2 units, 3 units, 4 units, 5 units, 6 units, or 7 units.

If the query has a number of units that is greater than the threshold, the query may be analyzed and unit reduction scores may be determined at step 360. As used herein, a unit reduction score is a score assigned to each unit based on one or more criteria. In some embodiments, units having a higher unit reduction score are more likely to be units that are displayed for the purposes of visualizing search results than units with a lower unit reduction score.

The unit reduction score for each unit may be determined by accessing one or more databases and assigning a score based on information contained in the database. Illustrative databases include, but are not limited to, a user analytics database 365, a results metadata database 370, a personal user history database 375, a topic taxonomy database 380, a document corpus database 385, and a similar user history database 390.

Figure 6:
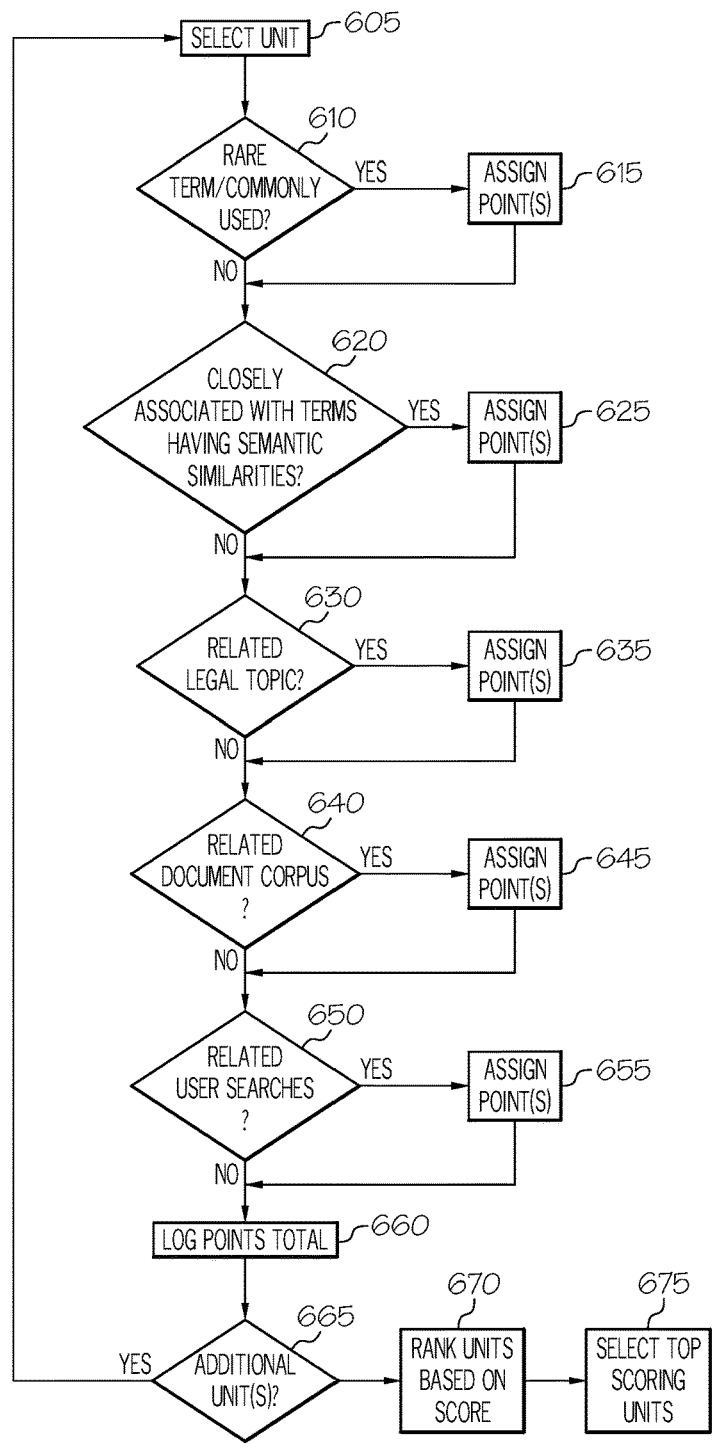
FIG. 6 depicts a flow diagram of an illustrative method of selecting top scoring units according to one or more embodiments shown and described herein.

Referring also to FIG. 6, additional detail regarding the determination of the reduction score is depicted. At step 605, a unit is selected for scoring and a determination is made as to whether the unit is one that is rare or one that is commonly used by the user at step 610. That is, various search histories, such as the user's search history, may be reviewed to determine if the unit is a term or group of terms that has been used in the past. The search history may be reviewed by accessing one or more databases, such as, for example, the user analytics database 365 and/or the personal user history database 375 and comparing database entries with one or more terms from the unit. If the unit is not commonly used (i.e., it is a rare term), then one or more points are assigned to the unit at step 615. The number of points that are assigned is not limited by this disclosure, and may be based upon any scoring methodology. In a nonlimiting example, 1 point may be assigned if the unit (or a search term therefrom) is rare. In another nonlimiting example, points may be assigned according to a scale of how frequently the unit (or a search term therefrom) has been used in the past such that more frequently used units receive fewer points than less frequently used units. FIG. 7 depicts an illustrative table of points that are assigned based on how often particular term combinations are used. In some embodiments, if the unit is commonly used by the user, points may not be assigned.

Referring again to FIGS. 3 and 6, at step 620, a determination is made as to whether the unit is closely associated with terms having semantic similarities. For example, if a unit includes the term "adverse possession" and metadata retrieved from the search results indicate that a large proportion of the search results relate to real estate, which is semantically similar to "adverse possession" and the term "adverse possession" is used in close proximity with other real estate terms (e.g., in the same sentence, the same phrase, the same paragraph, or the like), a determination may be made that the term has a high value because of its close topical (e.g., spatial) proximity to semantically similar terms. Such a determination may be made by accessing one or more databases such as, for example, the results metadata database 370, the topic taxonomy database 380, and/or the document corpus database 385. Higher value terms (e.g., terms in close proximity to semantically similar terms) may be assigned one or more points may be assigned to the unit at step 625. Similar to that as described above, the number of points that are assigned is not limited by this disclosure and may be based upon any scoring methodology. If the unit is not in close proximity to semantically similar terms, points may not be assigned.

In some embodiments, particularly embodiments where the search is a legal related search (e.g., a statute search, a case law search, a legal treatise search, and/or the like), a determination may be made as to whether the unit is related to a particular legal topic. For example, a unit that contains the term "adverse possession" may be recognized as being related to real estate law rather than another legal topic. Such a determination may be made, for example, by searching one or more databases, such as the topic taxonomy database 380 and/or the document corpus database 385 and comparing entries in the database with one or more terms from the unit. If the unit is related to a particular legal topic, one or more points may be assigned to the unit at step 635. Similar to that as described above, the number of points that are assigned is not limited by this disclosure and may be based upon any scoring methodology. If the unit is not related to a particular legal topic, points may not be assigned.

At step 640, a determination is made as to whether the unit is related to a document corpus. For example, if the unit contains the terms "basketball" and "football", it may be recognized as being related to a sports document corpus. Such a determination may be made, for example, by searching one or more databases, such as the topic taxonomy database 380 and/or the document corpus database 385 and comparing entries in the database with one or more terms from the unit. In some embodiments, terms from the topic taxonomy database 380 and/or the document corpus database 385 may be weighted according to what extent they have co-occurred with other query terms in close proximity within other documents. If the unit is related to a document corpus, one or more points may be assigned to the unit at step 645. Similar to that as described above, the number of points that are assigned is not limited by this disclosure and may be based upon any scoring methodology. If the unit is not related to a document corpus, points may not be assigned.

At step 650, a determination is made as to whether the unit is related to units that have been searched by other users. For example, if multiple users have searched for the terms "basketball", "football", and "sports", it may be determined that such a unit that contains one or more of these terms is related to the other user's searched units. Such a determination may be made, for example, by searching one or more databases, such as the similar user history database 390 and comparing entries in the database with one or more terms from the unit. If the unit is related to similar users' searches, one or more points may be assigned to the unit at step 655. However, such a determination is not limited by this disclosure, and other analyses using other assets may be used without departing from the scope of the present disclosure. Similar to that as described above, the number of points that are assigned is not limited by this disclosure and may be based upon any scoring methodology. If the unit is not related to similar users' searches, points may not be assigned.

At step 660, the number of points assigned to the unit may be tallied and logged in a file. Thereafter, a determination may be made as to whether additional units are to be assigned points in step 665. If additional units are to be assigned points, the process may repeat at step 605 until all units have been assigned points.

If no additional units exist, a document containing the tally of the number of points assigned to each unit may be reordered and ranked according to their scores at step 670. For example, units having a greater amount of points may be ranked ahead of units having a lower amount of points. However, other methods of tallying may be completed without departing from the scope of the present disclosure. For example, the tally may be according to a particular formula rather than a sum of the points. At step 675, the top scoring units up to the threshold amount may be selected as the units to be displayed. For example, if the threshold is 5 units, the top 5 units may be selected. Similarly, if the threshold is 3 units, the top 3 units may be selected.

Returning to FIG. 3, at step 395, the top scoring units are kept. It should generally be understood that step 395 may be an equivalent of step 675 of FIG. 6. While step 395 indicates the top 5 scoring units, it should be understood that the threshold may be greater than or less than 5 units, as previously described herein. Thus, if the threshold is 3, only 3 of the top scoring units may be kept at step 395.

Figure 8:
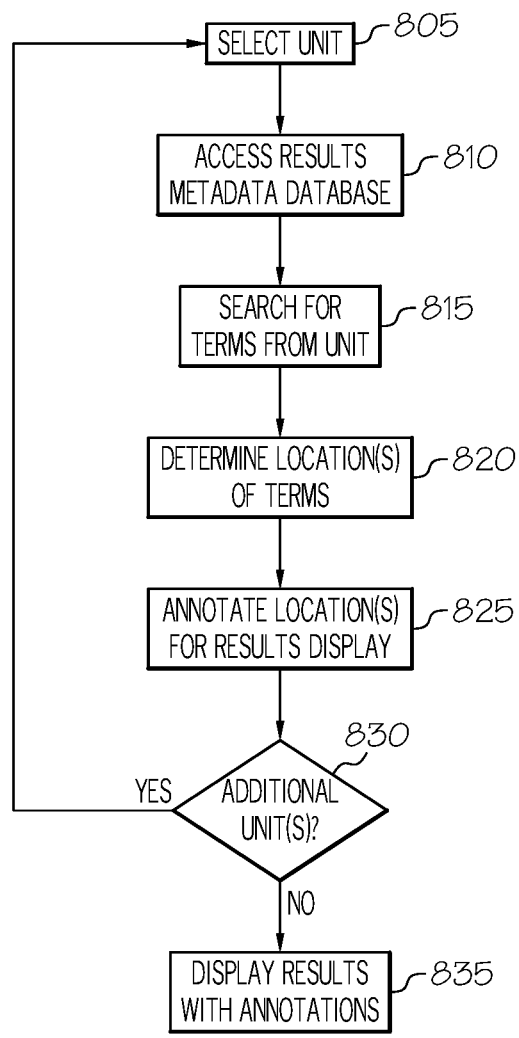
FIG. 8 depicts a flow diagram of an illustrative method of displaying results annotated with units according to one or more embodiments shown and described herein.

Once the number of units is at or less than the threshold, the metadata of each document in the search results may be retrieved at step 345 by accessing a results metadata database 355. The results metadata database 355 is generally a database containing metadata for each of the documents that appears in the search results. That is, the search that is conducted concurrently with the steps described herein (e.g., at step 305) returns one or more results. In some embodiments, the results metadata database 355 may be the same results metadata database 370 previously described herein. Metadata for each of the results is stored in the results metadata database 355. FIG. 8 provides additional detail with respect to retrieving metadata.

At step 805, a unit is selected and at step 810, the results metadata database is accessed. The results metadata database may be accessed via an interface, as described herein. The metadata of the search results is searched at step 815 to determine one or more locations of each term from the unit within each document in the search results at step 820. Once the one or more locations have been determined, each document in the search results may be annotated to indicate the location(s) at step 825. The process may repeat at step 805 for each of the units, as indicated by the determination of whether additional units exist at step 830. As such, each unit will be annotated in the document by a unique annotation (e.g., a first indicator, a second indicator, etc.) such that the units are distinguishable from one another based on the annotations. Once all of the units have been used to search the results metadata and annotate the results list, the results may be displayed with the annotations in step 835. Referring again to FIG. 3, the annotated results may be displayed as a part of rendering the display at step 350.

Figure 9:
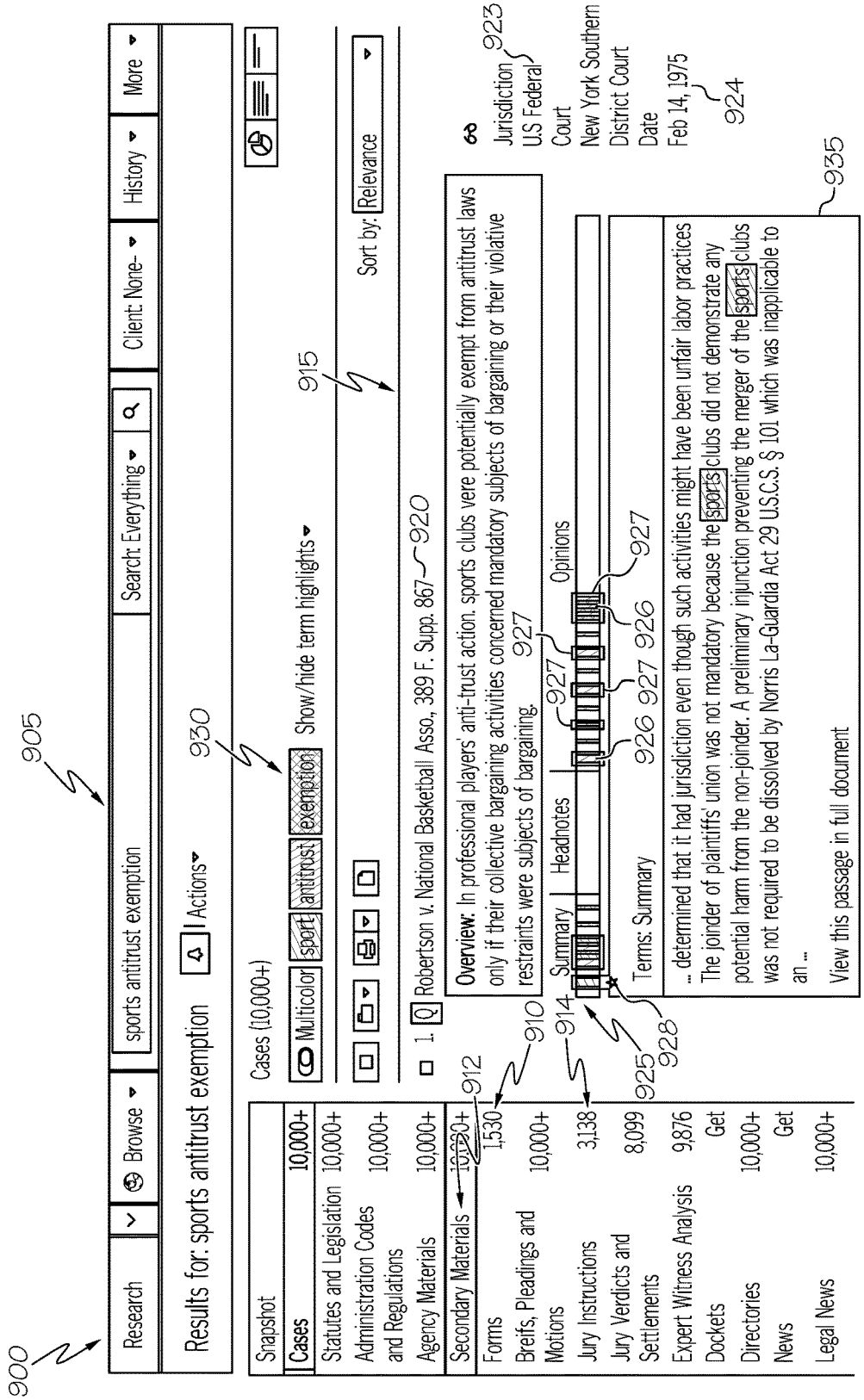
FIG. 9 depicts a screen shot of an illustrative user interface displaying search results annotated with units according to one or more embodiments shown and described herein.

An illustrative display that may be rendered is depicted in FIG. 9. The display may generally include a user interface 900 with a search bar 905, a results snapshot section 910, and/or a results display 915. The search bar 905 may contain the various components described herein with respect to FIG. 4.

The results snapshot section 910 may generally provide an overview of the search results divided into types of documents. For example, the results snapshot section 910 shown in FIG. 9 divides the search results into categories 912 such as cases; statutes and legislation; administrative codes and regulations; administrative materials; secondary materials; forms; briefs, pleadings, and motions; jury instructions; jury verdicts and settlements; expert witness analysis; dockets; directories; news; legal news, scientific; company and financial; and web categories. The categories 912 are nonlimiting examples. As such, other categories may be present without departing from the scope of the present disclosure. In addition, the results snapshot section 910 may show a number of search hits 914 that are present in each of the categories 912. For example, the results snapshot section 910 indicates that 1,530 search results have been categorized as forms. In some embodiments, the results snapshot section 910 may be interactive such that a user can select particular results to be shown. For example, if a user only desires to see search results related to statutes and legislation, the user may select (e.g., click) the "statutes and legislation" in the categories 912, which may cause the results display 915 to only display search results from that particular category, as described in greater detail herein.

The results display 915 generally includes a listing of the results of the search completed pursuant to the query submitted by the user. Each search result 920 may be displayed on one or more lines within the results display 915. The content that is displayed for each search result 920 is not limited by this disclosure, and can be any type and amount of content, including a title, a citation, text regarding a detailed description, text regarding an overview, and/or the like. In embodiments where legal databases are searched, each search result 920 may include, for example, a case name 921 and/or a reporter citation 922. Other information that may be included with each search result 920 may include, for example, a jurisdiction 923, a date 924, and/or the like. In some embodiments, each search result 920 may be expandable by the user to reveal additional information. For example, a user may select (e.g., click) a link in the search result 920 to display additional text regarding the result (e.g., a full document or the like) and/or hover a mouse pointer over a portion of the search result 920 to view additional information. As such, the term "search result" may be used interchangably with the term "document" herein. That is, a search result 920 may be a document that was discovered as a result of a search as described herein.

As a result of the steps described herein with respect to FIGS. 3, 6, and 8, each search result 920 may also include a hit pattern 925. In general, the hit pattern 925 provides a visualization to the user that indicates the location of the various search terms of the programmatically determined most relevant parts of the document within the search result 920. As shown in FIG. 9, the hit pattern 925 may include a breakdown of various sections of the search results. For example, if the search result 920 is a court opinion, the hit pattern 925 may display the various sections of the court opinion, such as the summary section, the headnotes (e.g., keywords) section, the opinions section, and/or the various other sections. Such sections are merely illustrative, and it should be understood that alternative, additional, or fewer sections may be used. Within one or more of the sections, the hit pattern 925 may also display one or more hashes 926. The hashes 926 may generally correspond to the indicators that have been annotated in the document, and indicate the location of a search term within each section, which allows a user to quickly and easily visualize where in the document the search terms are appearing, as well as a clustering of search terms. That is, a cluster of search terms may indicate an area of the document that is of greater interest to the user rather than a single search term that is isolated from other terms.

As described herein, a number of units may be displayed up to a particular threshold number. In order to distinguish each unit from each other within the hit pattern 925, the hashes 926 may be color coded or otherwise contain a distinguishing feature according to the unit that each hash 926 represents. As such, the user interface 900 may further include a selectable legend 930 that indicates which color corresponds to each unit. For example, as shown in FIG. 9, the legend 930 may indicate a first color for the term "sport", a second color for the term "antitrust", and a third color for the term "exemption", which may be toggled on or off to display the corresponding highlights within the search result 920, as described in greater detail herein. As such, in a first view that only displays certain information with regards to each search result 920 (e.g., a high level snapshot of each case in a plurality of cases that were discovered as a result of a search), certain terms within each search result 920 are highlighted with the corresponding color, which may also indicate where the terms appear with respect to the document, whether the terms are clustered or spread out, and where the terms appear in relation to one another. In addition, when a unit contains a plurality of terms, each of the terms in that unit will be coded with the same distinguishing feature (e.g., the terms "football", "basketball", and "sports" may all have the same color hashes 926 and may be highlighted in the same manner within each search result 920).

In various embodiments, within the first view as depicted in FIG. 9, the hashes and highlighted terms may only indicate terms that are the highest ranked in the document, a particular portion of the document, or the like. That is, the "highest ranked" terms are terms that have been determined to be more likely to be relevant to a particular user's search, and are annotated within the search result 920, as described in greater detail herein (e.g., step 825 in FIG. 8). Thus, the highest ranked terms may warrant being displayed to a user in a high level view of a particular search result 920 that does not contain all of the information of the search result 920, as described hereinbelow. In some embodiments, a first highest ranked section may be even further distinguished with a distinguishing feature 928. The first highest ranked term may generally be a term from all of the highest ranked terms that is most likely to be relevant to the user's search (i.e., having an even greater ranking than the other highest ranked terms), which may be determined as described in greater detail herein. That is, the first highest ranked term is set apart from the remaining highest ranked terms such that a user's attention is drawn to the first highest ranked term. The distinguishing feature 928 that is used for the purposes of indicating the first highest ranked term is not limited by this disclosure and may be any distinguishing feature. For example, as shown in FIG. 9, the distinguishing feature 928 may be a star or the like.

In some embodiments, the hit pattern 925 that is displayed in FIG. 9 may not indicate every single hit within the search result 920, particularly in instances where the search result 920 contains a large number of hits. Rather, the hit pattern 925 may only display a predetermined number of "most relevant" hits, such as hits that are determined to be more likely to be of interest to a user relative to other hits, highest ranked terms, and/or the like. In such embodiments, all of the hits may be provided in the hit pattern 925 when a user selects the search result 920 to view the entire search result 920, as described in greater detail herein.

While FIG. 9 relates generally to a color coded hit pattern 925 using colored hashes 926 to distinguish between units in a document, the present disclosure is not limited to such. For example, in some embodiments, the hit pattern 925 may utilize various different shadings for the hashes 926 to distinguish between units or may utilize other means of distinguishing between units without departing from the scope of the present disclosure.

In some embodiments, if a user desires to obtain additional information regarding a document in a search result 920, but does not want to access the entire document and scroll through it to find the hits, the user may select (e.g., click or hover a mouse pointer over) one or more of the hashes 926 and/or clusters of hashes 926 (e.g., a cluster bound by a box 927) to cause a overlay area 935 to appear on the results display 915. The overlay area 935 may show, for example, an excerpted version of the text of the document with the search terms highlighted so that the user can quickly determine whether the excerpted area is relevant to the search and move on to other sections or documents without having to navigate back to a previous screen, re-run a search, and/or the like.

In some embodiments, the box 927 may be movable relative to the hit pattern 925 such that a user can selectively move the box 927 to a desired location on the hit pattern 925. For example, the box 927 a slider type box that can be actuated by the user and moved along the hit pattern 925 such that it surrounds a particular area of interest within the hit pattern 925. That is, a user can slide the box 927 to a particular area of interest, such as an area that contains a particular concentration of hashes 926, an area that has a concentration of a particular color/shading of hashes 926, an area that has a particular grouping of different colors/shadings of hashes 926, an area indicated with the distinguishing feature 928, and/or the like. The contents of the overlay area 435 may be updated in real time such that the overlay area 435 displays updated text of the search result 920 that corresponds to the various hashes 926 bound by the box 927. That is, the system is configured to allow the user to instantly select, via the box 927, one or more particular areas of interest within the search result 920 based on the clustering of the hashes 926 (or other factors) and instantly see the corresponding text within the search result 920 without having to select the search result 920 from all of the results in the results display 915, wait for the full text of the search result 920 to be displayed, and then scroll down to a particular area of interest. In some embodiments, the box 927 may only be operable (i.e., movable) when a particular document is fully opened (i.e., not a preview of a document within a list of search results).

An initial location of the box 927 (i.e., a location of the box 927 that is presented before a user moves it) may indicate, for example, an excerpted portion of the search result 920 that has been automatically determined to be a "best excerpt" based on a cluster of units, a particular section of the search result 920, a section of the search result 920 that is well recognized in seminal and/or landmark cases, a section of the search result 920 that contains a discussion of public policy, a section of the search result 920 that has a relevance that exceeds a threshold for inclusion, and/or the like. In some embodiments, the portion of the text that is displayed within the overlay area 935 may by visually differentiated from the rest of the text (e.g., highlighting, bold text, etc.) or made salient (e.g., entities, phrases, document references, etc.) In embodiments where a cluster containing a plurality of different units is selected by the user, the distinguishing feature (e.g., color) of the highlighting in the overlay area 935 may correspond to the color of the hash 926 used for a particular unit, as shown in FIG. 10. As such, the user may be able to quickly distinguish between terms in the overlay area 935 to obtain the information needed.

Referring again to FIG. 9, in some embodiments, the legend 930 may contain check boxes or the like that would allow the user to select or deselect certain units. For example, a user may deselect a particular unit from the legend 930 (e.g., by clicking on the unit), which may cause the hashes 926 in the hit pattern 925 corresponding to that unit to disappear. Similarly, the highlighting of the terms from the unit would no longer be highlighted in the overlay area 935. However, it should be understood that selecting or unselecting a particular unit from the legend 930 merely affects the display of the results and does not alter the actual search (i.e., the terms from the unit are still present as search terms and the search results still incorporate the terms therein).

Figure 11:
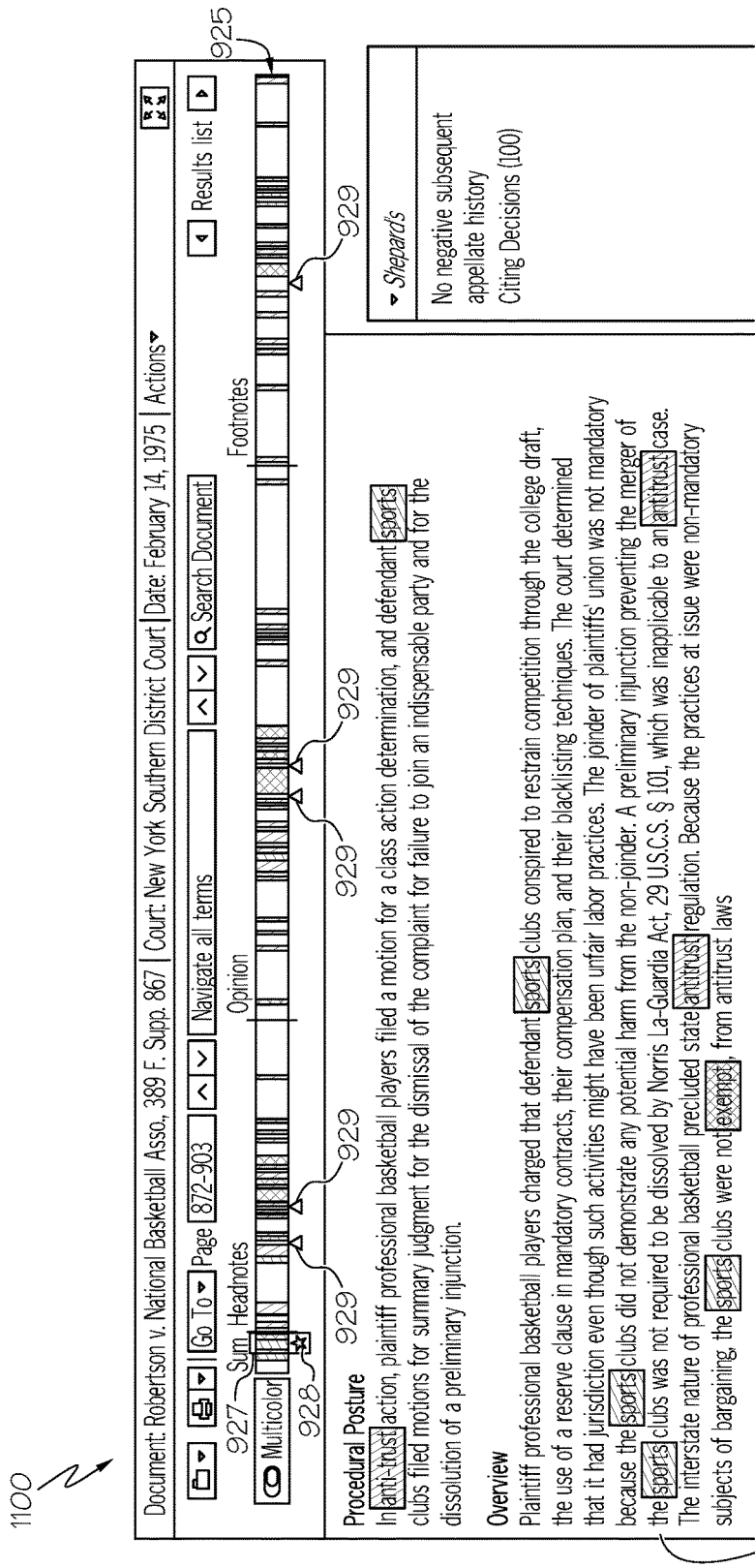
FIG. 11 depicts a screen shot of an illustrative full document view according to one or more embodiments shown and described herein.

In some embodiments, the user may desire to see the entire document instead of particular excerpts from the document. In such embodiments, the user may select (e.g., click) the search result 920 (e.g., a document title or the like), which may result in a whole document view 1100, as shown in FIG. 11. In some embodiments, the user may click on, or otherwise select, the overlay area 935, which may open up the whole document view 1100 as shown in FIG. 11 to the section within the document containing the excerpted text in the overlay area 935. Similar to the results view shown in FIGS. 9 and 10, the whole document view 1100 of FIG. 11 also displays the hit pattern 925 with the hashes 926 and highlights the search terms within a document display area 940 in a color corresponding to the hashes 926. However, as described hereinabove, in embodiments where the hit pattern 925 displayed in FIG. 9 does not indicate all of the hits within the search result 920 (e.g., because the search result 920 has a large number of hits), the view provided in FIG. 11 may update the hit pattern 925 to show all of the hits within the search results 920. As such, the user is provided with even greater detail with respect to the hits within the search result 920.

In some embodiments, the whole document view 1100 may further display one or more hit cluster indicators 929 on or adjacent to the hit pattern 925 that correspond to clusters of hashes 926 that indicate hits that are more closely associated with particular search results than other hits within the search result 920. As such, the hit cluster indicators 929 may allow a user to find areas of the search result 920 that are likely to more closely correspond to information that is being searched. As such, the user may move the box 927 so that it bounds an area of hashes 926 that are indicated by the hit cluster indicators 929 and view the corresponding text within the search result 920. As a result, a user may be able to more quickly locate areas of interest within the search result 920 without having to expend as much time and/or effort scrolling through the search result 920 to find such areas.

As a result of providing the user interface 900 described herein with respect to FIGS. 9-11, the user may be able to better visualize why each search result 920 was selected and/or ranked for displaying, visualize portions of each search result 920 that are most (or more) pertinent to the user based on the user's inputted search terms, visualize why one particular search result may be ranked higher on the list of results than another particular search result, visualize how many excerpts exceeded a threshold, and/or visualize how many terms are in an excerpt (i.e., a higher number of terms results in a higher ranking). This may be especially possible in instances where the reasoning for ranking would not otherwise be noticeable to the user. In addition, the user interface 900 indicates the differences in the content of a particular search result 920 versus how a particular user may actually use the content in his/her research.

Figure 12:
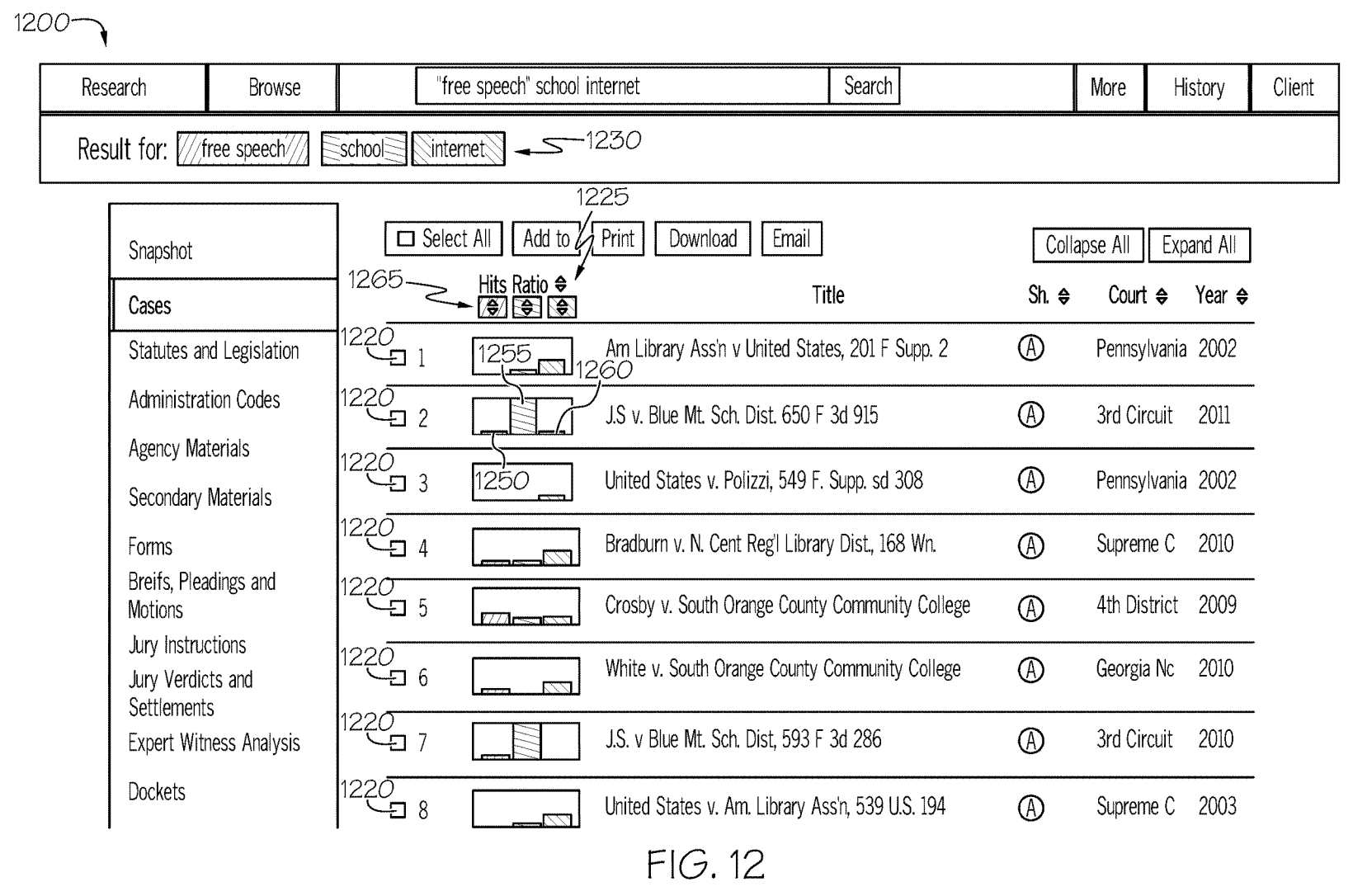

It should be understood that the user interface 900 described with respect to FIGS. 9-11 is merely illustrative, and other user interfaces that utilize the information obtained from the steps described herein to provide ordered search results to a user are contemplated and possible. For example, in some embodiments, as shown in FIG. 12, an alternative user interface 1200 may include an alternative hit pattern section 1225 for each of the one or more search results 1220. More particularly, the alternative hit pattern section 1225 may be a bar graph indicating the total number of hits in each of the one or more search results 1220 for each unit, which may also be referred to as a "sparkline" visualization. That is, a first bar 1250 may indicate the total number of hits for a first unit, a second bar 1255 may indicate the total number of hits for a second unit, and a third bar 1260 may indicate the total number of hits for a third unit. The larger the bar (i.e., the taller in length of the bar), the greater number of hits that are present in the particular search results. For example, as shown in FIG. 12, the search result "J.S. v. Blue Mt. Sch. Dist." indicates an alternative hit pattern section 1225 whereby the second bar 1255 has a greater amount of hits than the first bar 1250 and the third bar 1260. As indicated by the legend 1230, the second bar 1255 corresponds to the search term "school". As such, a user, upon viewing the alternative hit pattern section 1225, may recognize that the search result "J.S. v. Blue Mt. Sch. Dist." uses the term "school" often. In some embodiments, the bars 1250, 1255, 1260 may be sized according to their respective proportionality. That is, if a search result uses the term "school" twice as often as the term "internet", then the second bar 1255 (corresponding to the term "school") may be twice as tall as the third bar 1260 (corresponding to the term "internet"). In some embodiments, the bars 1250, 1255, 1260 may relate to hits for the entire document, hits in a particular section or plurality of sections, and/or the like.

Figure 13:
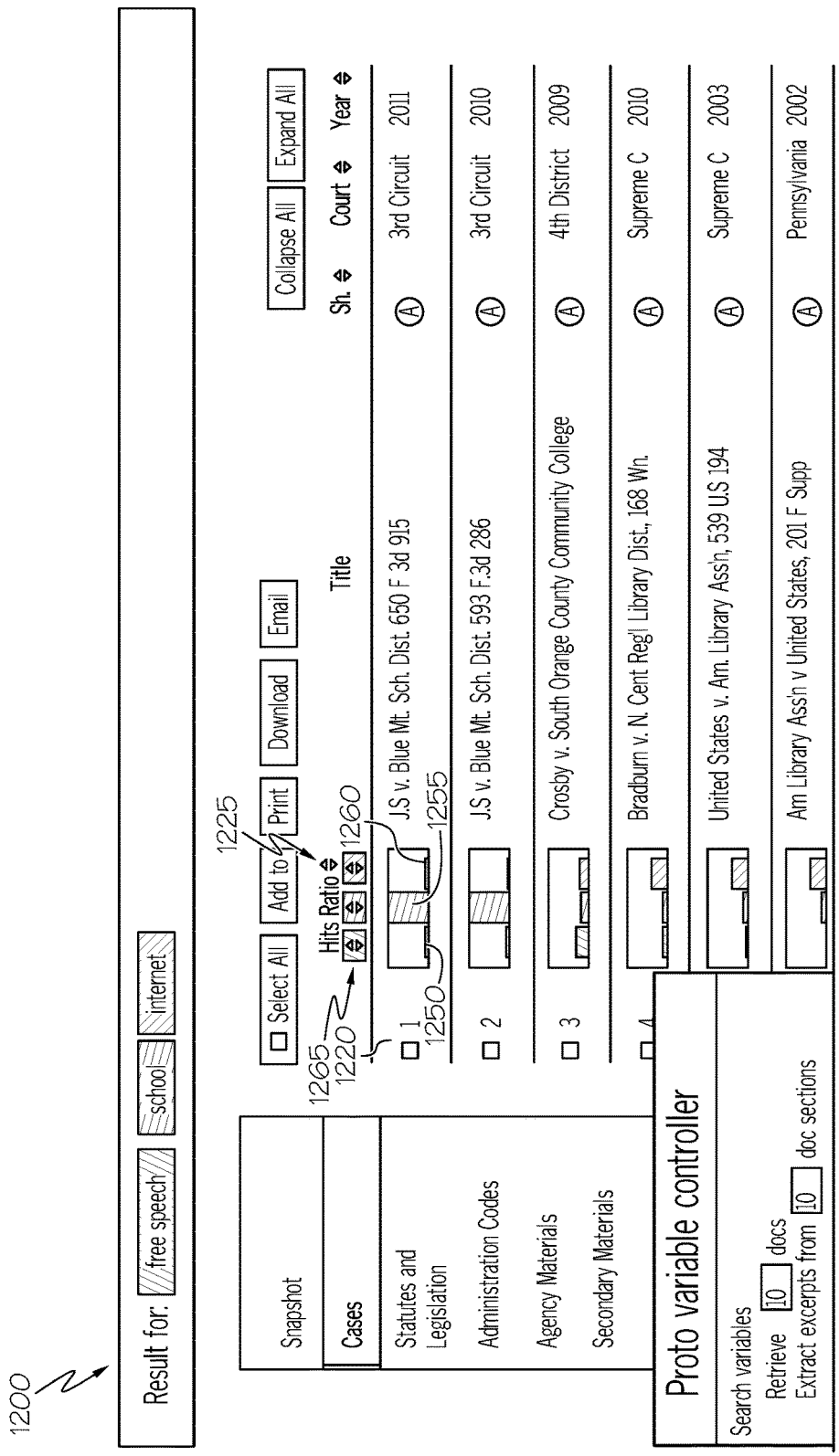
FIG. 13 depicts a screen shot of the alternative user interface of FIG. 12 with reordered search results according to one or more embodiments shown and described herein.

Referring also to FIG. 13, in some embodiments, the alternative user interface 1200 may provide the user with an ability to reorder the search results 1220 by indicating in alternative hit pattern section 1225 which terms have a greater interest. That is, if a user desires to see the search results 1220 that contain the most mentions of the term "school" at the top of the results, the user may select a corresponding one of the reorder buttons 1265 (e.g., the center one of the reorder buttons 1265), which will reorder the search results 1220 accordingly. Similarly, if the user desires to reorder the search results to indicate which search results include the most mentions of the term "school" and the term "internet" at the top of the results, the user may select the corresponding two of the reorder buttons 1265, which will reorder the search results 1220 accordingly. It should be understood that the reorder buttons 1265 may also be used to reorder the search results 1220 to show a least amount of hits at the top of the results and may also be used to reorder the search results 1220 to show the results having the most evenly distributed amount of the terms (e.g., the various terms appear in substantially equal amounts with respect to each other) at the top of the results. In some embodiments, the reorder buttons 1265 may also be used to restore a default or original relevance ranking (i.e., an initial relevance ranking that was initially provided to the user).

Figure 14:
FIG. 14 depicts a screen shot of the alternative user interface of FIG. 12 with a pop-up display according to one or more embodiments shown and described herein.

Referring now to FIG. 14, in some embodiments, the alternative user interface 1200 may present a pop-up display 1270 when activated by a user. The pop-up display 1270 may be activated, for example, when a user hovers over a particular area of the alternative user interface 1200, such as one of the search results 1220. Other means of activating the pop-up display 1270 are contemplated and possible. The pop-up display 1270 may generally present additional information regarding the particular one of the search results 1220 without requiring a user to fully open the document to view its contents. For example, as shown in FIG. 14, the pop-up display 1270 may provide information relating to an overview section of a document presented in the search results 1220. In some embodiments, various terms may be highlighted in the text of the pop-up display 1270.

Figure 15:
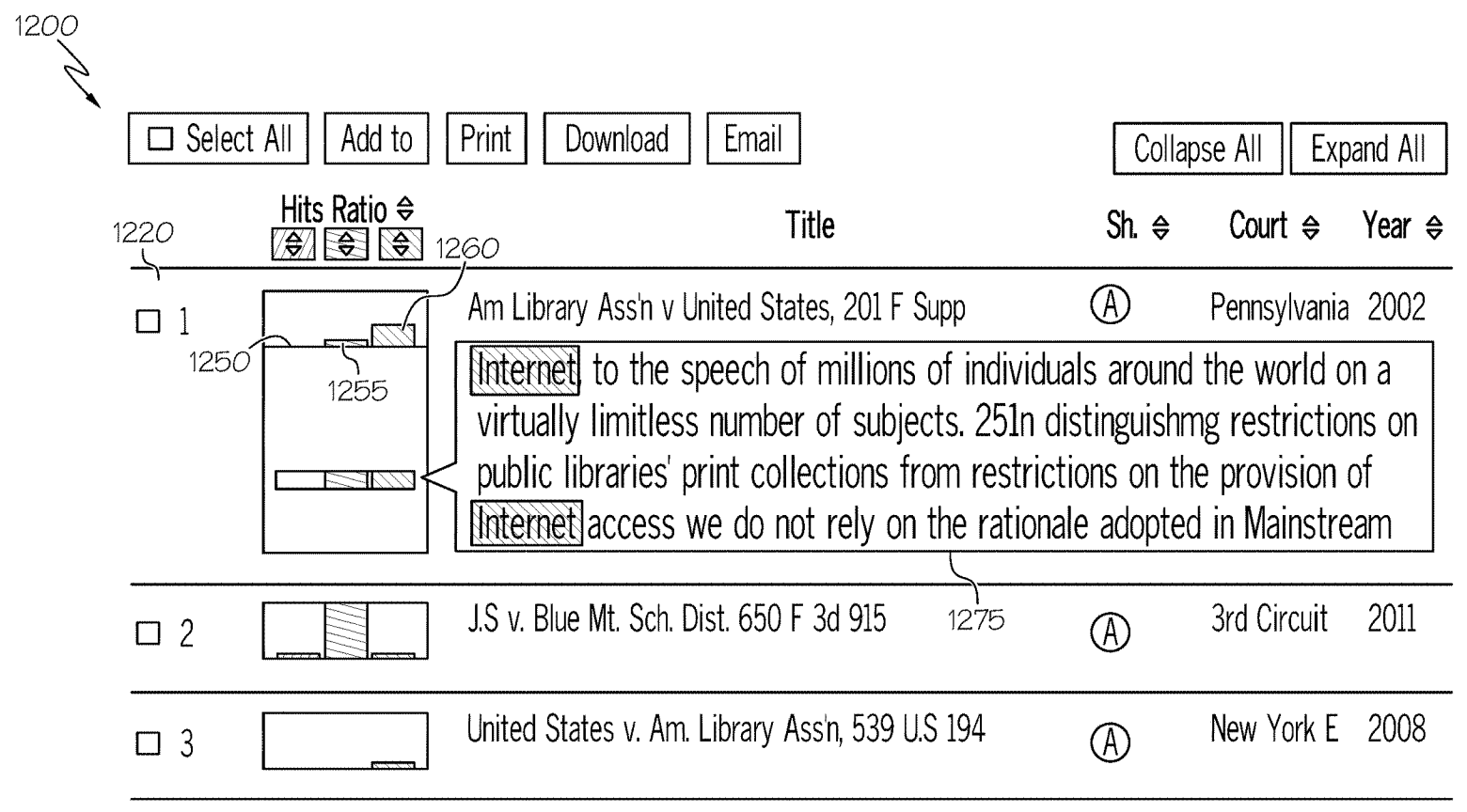

As an alternative to the pop-up display 1270, in some embodiments, the alternative user interface 1200 may expand to display a detailed results section 1275, as shown in FIG. 15. The detailed results section 1275 may be similar to the pop-up display 1270 (FIG. 14) and/or the overlay area 935 (FIG. 9). That is, the detailed results section 1275 may provide additional information regarding a particular one of the search results 1220 without requiring a user to fully open the document to view its contents. For example, as shown in FIG. 15, the detailed results section 1275 may provide one or more selected portions of the text of a document from the search results 1220, such as, for example, portions containing search terms, which may be highlighted, as described in greater detail herein. In addition, a user may select one of the bars 1250, 1255, 1260 to cause the detailed results section 1275 to display text of the document that includes keywords corresponding to the selected one of the bars 1250, 1255, 1260. For example, if a user selects the third bar 1260, which corresponds to the search term "internet", the detailed results section 1275 may display a portion of the text that includes the term "internet" therein. In addition, the term "internet" may be highlighted within the displayed text.

Figure 16:
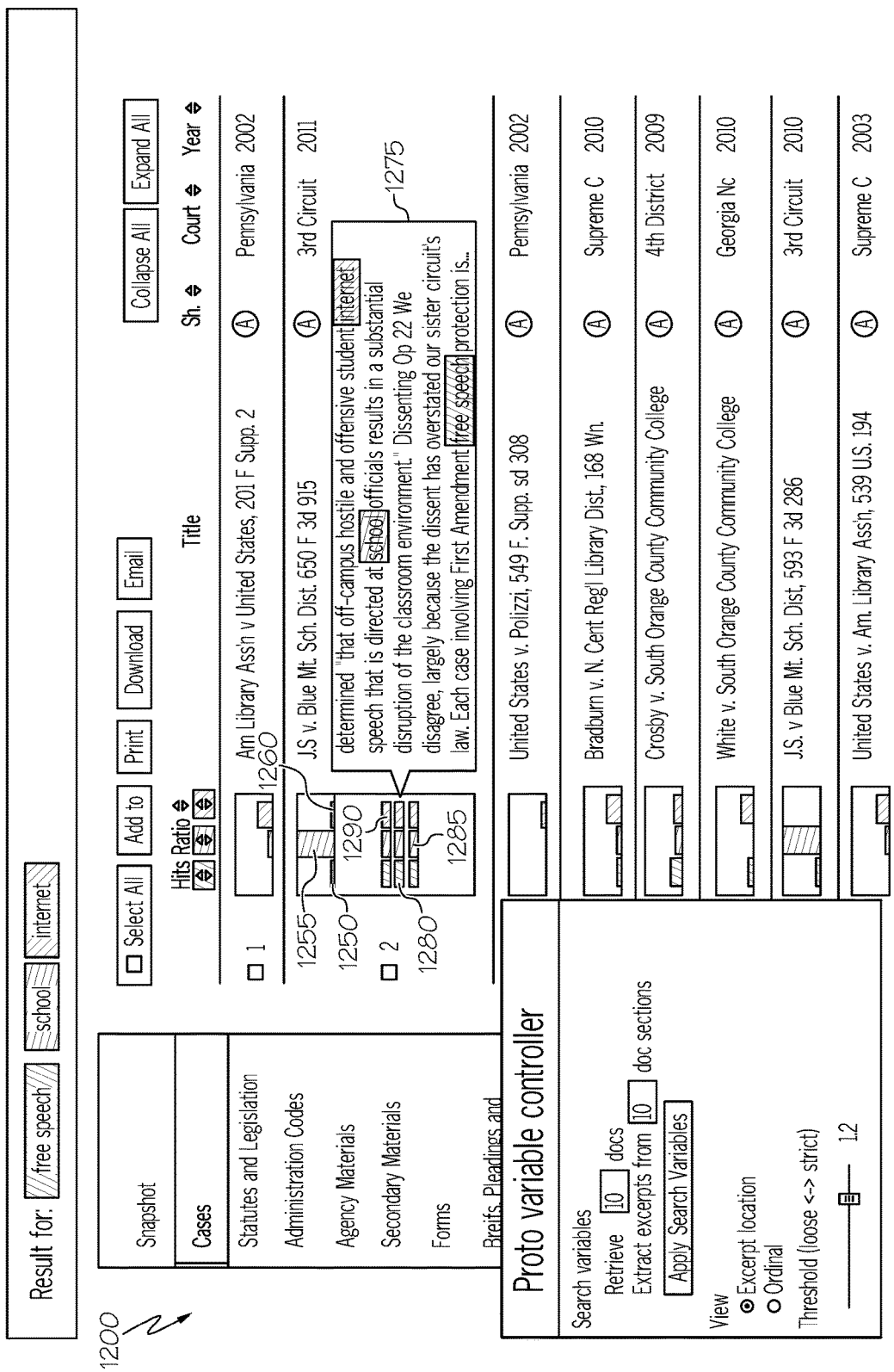
FIG. 16 depicts a screen shot of the alternative user interface of FIG. 12 with a plurality of expanded bars according to one or more embodiments shown and described herein.

In some embodiments, the alternative user interface 1200 may provide a navigable expanded detailed results section 1275, as shown in FIG. 16. More specifically, the bars 1250, 1255, 1260 may each expand into a plurality of bars when the detailed results section 1275 is expanded, thereby allowing a user to select one or more of the plurality of expanded bars 1280, 1285, 1290 to display various portions of the text of the document in the detailed results section 1275. Such embodiments may allow a user to more efficiently inspect documents from the search list by navigating between excerpts and/or various locations in the document, but still without having to open the entire document to view its contents. However, it should be understood that such an user interface 1200 is merely illustrative, and other means providing a user with interactions with visual elements in order to show corresponding content is within the scope of the present disclosure.

The plurality of expanded bars 1280, 1285, 1290 is merely illustrative and not limited by this disclosure. As such, other means of allowing a user to visualize and navigate between portions of the text within the expanded detailed results section 1275 are contemplated and possible. For example, in some embodiments, one or more hashes appearing in clusters (similar to that as described above with respect to FIGS. 9-11) may be used. In addition, the alternative user interface 1200 may convey other types of information to the user without requiring the user to navigate into the document, including volume of hits, proportion of hits, location of hits, and/or the like.

Figure 17:
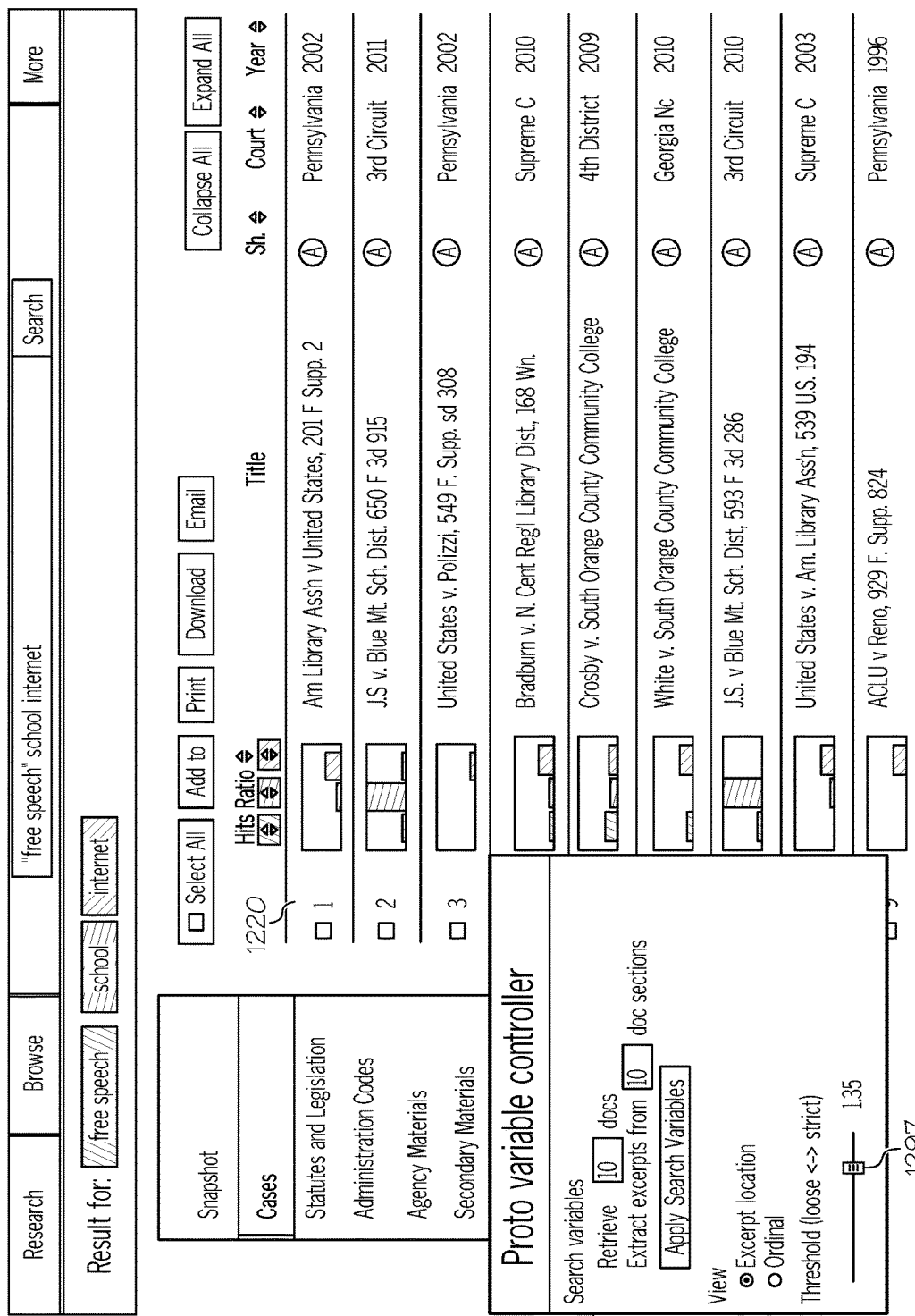
FIG. 17 depicts a screen shot of the alternative user interface of FIG. 12 with a prototype variable controller pop up box according to one or more embodiments shown and described herein.

In some embodiments, the alternative user interface 1200 may be configurable by a user to only display results based on the closeness of the search terms with respect to each other, as depicted in FIG. 17. Such embodiments may ensure that documents having clusters of units close to one another within the document are displayed higher in the search results 1220 than documents having a spread out arrangement of units within the document. Alternatively, the documents having a spread out arrangement may be omitted entirely. In some embodiments, the user interface 1200 may allow a user to control the sensitivity of the clustering (e.g., indicating how "spread out" a cluster may be within the text of a document). In a nonlimiting example, a user may adjust the sensitivity of the clustering by indicating that 5 hits within 100 words of text is a minimum threshold for a cluster. In another nonlimiting example, a user may adjust the sensitivity of the clustering by indicating that 3 hits within a paragraph is a minimum threshold for a cluster. In some embodiments, adjusting the sensitivity may be completed by the user by accessing a protoype variable controller popup window 1295 and adjusting a slider 1297. For example, moving the slider 1297 to the left may "loosen" the threshold and show clusters that are more spread out within the text. Similarly, moving the slider 1297 to the right might "tighten" the threshold and show clusters of hits that are closer together. It should be understood that such a proto variable controller popup window 1295 is merely illustrative and other means of adjusting the sensitivity are contemplated and possible. Such a feature may manifest as a user control setting or as a default display setting.

In some embodiments, the various user interfaces described herein may allow a user to determine an alternative sort order that is independent from a sort order automatically generated by any search engine algorithm, which may result in the discovery of a more customized and useful search ranking to the user that would not necessarily be predicted by a search algorithm. Thus, the customizability of the visualization to a particular user's needs allows for a checks-and-balances approach that is used in conjunction with a search engine and/or search algorithm. As such, a balance may be struck between search results that are determined by rankings (e.g., the processes described herein) versus search results that are determined by a specific metric (e.g., typical search engine processes).

It should be understood that the various user interfaces are merely illustrative. As such, any combination of the various features that are described with respect to FIGS. 9-17, as well as features not specifically described herein, are contemplated and possible without departing from the scope of the present disclosure.

It should now be understood that the systems and methods described herein allow a user to submit a search query, and at substantially the same time as the search is conducted, the search terms are grouped into units and the number of units is reduced below a threshold (if necessary). Such a grouping includes determining which terms contain similarities to group into a unit for the purposes of displaying and presenting to the user. Such a reduction includes determining which units are the most likely to be useful by a user in determining documents to review. The grouping and reducing is generally completed in substantially the same amount of time as the search such that a user does not experience a delay in conducting a search. Once the search, the grouping, and the reducing are completed, a display is rendered to the user. The display allows the user to visualize hit patterns in the search results at both a document level and a collection level by embedding miniature charts to transcend the effectiveness of a traditional results list. As such, the user is able to more quickly and efficiently determine which documents from a results list are relevant and/or of interest without having to view the entirety of the document.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of displaying a visualizable results list, the method comprising:
   receiving, by a processing device, a search query, wherein the search query comprises a plurality of search terms;
   grouping, by the processing device, the plurality of search terms into a plurality of units, wherein each of the plurality of units comprises a related one or more of the plurality of search terms;

accessing, by the processing device, metadata for each document in a plurality of search results that corresponds to the search query;

annotating, by the processing device, one or more highest ranked locations in each document with a first indicator for each of the one or more highest ranked search terms in a first unit of the plurality of units and a second indicator for each of the one or more search terms in a second unit of the plurality of units based on the metadata, wherein the highest ranked search terms in the first unit are terms that have been determined by the processing device to be more likely to be relevant to the search query relative to other terms; and displaying, by the processing device, a visualizable results list comprising:
the plurality of search results,
a corresponding hit pattern for each document in the plurality of search results, wherein the hit pattern for each search result comprises:
one or more sections of the document,
a first one or more hashes corresponding to each first indicator,
a second one or more hashes corresponding to each second indicator, the first one or more hashes and the second one or more hashes positioned within the hit pattern in one or more locations that correspond to the one or more locations of the search terms in the document, the second one or more hashes are visually distinguishable from the first one or more hashes,
a box that surrounds at least one of the first one or more hashes and the second one or more hashes and is movable along a length of the hit pattern such that the box can be moved to a particular location on the hit pattern, and
an overlay area positioned underneath the hit pattern, the overlay area displaying text from the document that corresponds to a positioning of the box and highlighting the search terms within the displayed text such that a portion of the document corresponding to the particular location indicated by the box on the hit pattern is viewable within the overlay area with the search terms highlighted.

2. The method of claim 1, wherein annotating the one or more locations with the first indicator and the second indicator comprises annotating one or more highest ranked locations with the second indicator for each of one or more highest ranked search terms in the second unit.

3. The method of claim 2, wherein the hit pattern displays, via the first one or more hashes and the second one or more hashes, the highest ranked search terms in the first unit and the second unit.

4. The method of claim 1, wherein the first one or more hashes are distinguishable from the second one or more hashes.

5. The method of claim 1, wherein the text contains annotations that correspond to the at least one of the first one or more hashes and the second one or more hashes surrounded by the box.

6. The method of claim 1, wherein the box is further movable relative to the hit pattern to surround a second area of at least one of the first one or more hashes and the second one or more hashes and the overlay area displays updated text from the document that corresponds to the second area surrounded by the box.

7. The method of claim 1, wherein the hit pattern further comprises one or more hit cluster indicators that correspond to a first one or more clusters of the first one or more hashes and the second one or more hashes that are more closely associated with the plurality of search terms relative to a second one or more clusters of the first one or more hashes and the second one or more hashes.

8. The method of claim 1, further comprising:
annotating, by the processing device, one or more locations in each document with a third indicator for each of the one or more search terms in a third unit of the plurality of units based on the metadata.

9. The method of claim 8, wherein the hit pattern comprises a third one or more hashes corresponding to each third indicator, the third one or more hashes positioned within the hit pattern in one or more locations that correspond to the one or more locations of the search terms in each document.

10. The method of claim 1, wherein the terms that have been determined to be more likely to be relevant to the search query relative to the other terms is based on at least one of whether the terms are associated with terms having semantic similarities, whether the terms pertain to a related legal topic, whether the terms pertain to a related document corpus, and whether the terms pertain to related user searches.

11. A system for displaying a visualizable results list, the system comprising:
a processing device; and
a non-transitory, processor-readable storage medium in communication with the processing device, wherein the non-transitory, processor-readable storage medium comprises one or more programming instructions that, when executed, cause the processing device to:
receive a search query, wherein the search query comprises a plurality of search terms,
group the plurality of search terms into a plurality of units, wherein each of the plurality of units comprises a related one or more of the plurality of search terms,
access metadata for each document in a plurality of search results that corresponds to the search query,
annotate one or more highest ranked locations in each document with a first indicator for each of the one or more highest ranked search terms in a first unit of the plurality of units and a second indicator for each of the one or more search terms in a second unit of the plurality of units based on the metadata, wherein the highest ranked search terms in the first unit have been determined by the processing device to be more likely to be relevant to the search query relative to other terms, and
display a visualizable results list comprising:
the plurality of search results,
a corresponding hit pattern for each document in the plurality of search results, wherein the hit pattern for each search result comprises:
one or more sections of the document,
a first one or more hashes corresponding to each first indicator, and
a second one or more hashes corresponding to each second indicator, the first one or more hashes and the second one or more hashes positioned within the hit pattern in one or more locations that correspond to the one or more locations of the search terms in the document, the second one or more hashes are visually distinguishable from the first one or more hashes, a box that surrounds at least one of the first one or more hashes and the second one or more hashes and is movable along a length of the hit pattern such that the box can be moved to a particular location on the hit pattern, and an overlay area positioned underneath the hit pattern, the overlay area displaying text from the document that corresponds to a positioning of the box and highlighting the search terms within the displayed text such that a portion of the document corresponding to the particular location indicated by the box on the hit pattern is viewable within the overlay area with the search terms highlighted.

12. The system of claim 11, wherein the one or more programming instructions that, when executed, cause the processing device to annotate the one or more locations with the first indicator and the second indicator further cause the processing device to:

annotate one or more highest ranked locations with the second indicator for each of one or more highest ranked search terms in the second unit.

13. The system of claim 12, wherein the hit pattern displays, via the first one or more hashes and the second one or more hashes, the highest ranked search terms in the first unit and the second unit.

14. The system of claim 11, wherein the first one or more hashes are distinguishable from the second one or more hashes.

15. The system of claim 11, wherein the text contains annotations that correspond to the at least one of the first one or more hashes and the second one or more hashes surrounded by the box.

16. The system of claim 11, wherein the box is further movable relative to the hit pattern to surround a second area of at least one of the first one or more hashes and the second one or more hashes and the overlay area displays updated text from the document that corresponds to the second area surrounded by the box.

17. The system of claim 11, wherein the hit pattern further comprises one or more hit cluster indicators that correspond to a first one or more clusters of the first one or more hashes and the second one or more hashes that are more closely associated with the plurality of search terms relative to a second one or more clusters of the first one or more hashes and the second one or more hashes.

18. The system of claim 11, wherein the non-transitory, processor readable storage medium further comprises one or more programming instructions that, when executed cause the processing device to:

annotate one or more locations in each document with a third indicator for each of the one or more search terms in a third unit of the plurality of units based on the metadata, wherein the hit pattern comprises a third one or more hashes corresponding to each third indicator, the third one or more hashes positioned within the hit pattern in one or more locations that correspond to the one or more locations of the search terms in each document.

19. A non-transitory storage medium comprising program code for displaying a visualizable results list, the computer program code, when executed, causing a processing device to:

receive a search query, wherein the search query comprises a plurality of search terms, group the plurality of search terms into a plurality of units, wherein each of the plurality of units comprises a related one or more of the plurality of search terms, access metadata for each document in a plurality of search results that corresponds to the search query, annotate one or more highest ranked locations in each document with a first indicator for each of the one or more highest ranked search terms in a first unit of the plurality of units and a second indicator for each of the one or more search terms in a second unit of the plurality of units based on the metadata, wherein the highest ranked search terms in the first unit have been determined by the processing device to be more likely to be relevant to the search query relative to other terms, and display a visualizable results list comprising:
the plurality of search results,
a corresponding hit pattern for each document in the plurality of search results, wherein the hit pattern for each search result comprises:
one or more sections of the document,
a first one or more hashes corresponding to each first indicator, and
a second one or more hashes corresponding to each second indicator, the first one or more hashes and the second one or more hashes positioned within the hit pattern in one or more locations that correspond to the one or more locations of the search terms in the document, the second one or more hashes are visually distinguishable from the first one or more hashes,
a box that surrounds at least one of the first one or more hashes and the second one or more hashes and is movable along a length of the hit pattern such that the box can be moved to a particular location on the hit pattern, and
an overlay area positioned underneath the hit pattern, the overlay area displaying text from the document that corresponds to a positioning of the box and highlighting the search terms within the displayed text such that a portion of the document corresponding to the particular location indicated by the box on the hit pattern is viewable within the overlay area with the search terms highlighted.

20. The non-transitory storage medium of claim 19, wherein the hit pattern displays, via the first one or more hashes and the second one or more hashes, the highest ranked search terms in the first unit and the second unit.

* * * * *